(12) United States Patent
McCoy et al.

(10) Patent No.: US 12,079,807 B2
(45) Date of Patent: Sep. 3, 2024

(54) VALIDATION SERVICE FOR ACCOUNT VERIFICATION

(71) Applicant: Visa International Service Association, San Francisco, CA (US)

(72) Inventors: Blake McCoy, Foster City, CA (US); Andreas Aabye, San Mateo, CA (US); Paul Tait, San Mateo, CA (US); Phillip Lavender, San Francisco, CA (US); Lily Cai, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 589 days.

(21) Appl. No.: 17/285,798

(22) PCT Filed: Oct. 23, 2019

(86) PCT No.: PCT/US2019/057572
§ 371 (c)(1),
(2) Date: Apr. 15, 2021

(87) PCT Pub. No.: WO2020/086668
PCT Pub. Date: Apr. 30, 2020

(65) Prior Publication Data
US 2021/0383378 A1 Dec. 9, 2021

Related U.S. Application Data
(60) Provisional application No. 62/749,304, filed on Oct. 23, 2018.

(51) Int. Cl.
*G06Q 20/40* (2012.01)
*H04L 9/08* (2006.01)
(52) U.S. Cl.
CPC ........... *G06Q 20/401* (2013.01); *H04L 9/088* (2013.01)

(58) Field of Classification Search
CPC .............................. G06Q 20/401; H04L 9/088
See application file for complete search history.

(56) References Cited

U.S. PATENT DOCUMENTS

| | | | |
|---|---|---|---|
| 5,142,578 A * | 8/1992 | Matyas ................. | H04L 9/0894 |
| | | | 712/E9.032 |
| 8,001,054 B1 * | 8/2011 | Peart .................... | H04L 9/3236 |
| | | | 705/64 |

(Continued)

FOREIGN PATENT DOCUMENTS

| CN | 107430731 A | 12/2017 |
|---|---|---|
| KR | 20060119967 | 11/2006 |

(Continued)

OTHER PUBLICATIONS

Oludele Ogundele et al., The Implementation of a Full EMV Smartcard for a Point-of-Sale Transaction and its Impact on the PCI DSS, Jan. 10, 2013, IEEE, pp. 797-806 (Year: 2013).*

(Continued)

*Primary Examiner* — Nilesh B Khatri
(74) *Attorney, Agent, or Firm* — Kilpatrick Townsend & Stockton LLP

(57) ABSTRACT

A method and system for authorizing a secure transaction using a portable device is disclosed. The method includes an authorization process performed in real-time that includes two phases: an authentication phase and a transaction processing phase. In the authentication phase, a resource provider system may receive a cryptogram from a portable device and verify the cryptogram. Upon the resource provider system obtaining an authentication response indicator, the transaction processing phase may include the resource provider system generating and transmitting an authorization request message to a processing computer. The resource provider system may then receive an authorization response (Continued)

message from the processing computer including an authorization response indicator, which completes the authorization process.

14 Claims, 7 Drawing Sheets

(56) References Cited

U.S. PATENT DOCUMENTS

| | | | |
|---|---|---|---|
| 10,361,856 | B2 | 7/2019 | Cassin |
| 10,984,416 | B2* | 4/2021 | Ilincic ............... G06Q 20/38215 |
| 2005/0059352 | A1 | 3/2005 | Mclean |
| 2010/0235283 | A1* | 9/2010 | Gerson ................ G06Q 20/401 |
| | | | 379/88.16 |
| 2010/0252623 | A1 | 10/2010 | Hammad |
| 2013/0006862 | A1 | 1/2013 | Graham |
| 2013/0007846 | A1 | 1/2013 | Murakami et al. |
| 2015/0012434 | A1* | 1/2015 | Aabye ................ G06Q 20/4016 |
| | | | 705/44 |
| 2016/0065370 | A1* | 3/2016 | Le Saint ............... H04L 9/0891 |
| | | | 713/155 |
| 2016/0232527 | A1 | 8/2016 | Patterson |
| 2016/0294556 | A1 | 10/2016 | Vortriede |
| 2017/0161727 | A1* | 6/2017 | Gupta .................. G06Q 20/389 |
| 2017/0286663 | A1 | 10/2017 | Hurry et al. |
| 2018/0006821 | A1 | 1/2018 | Kinagi |
| 2018/0232722 | A1 | 8/2018 | Wong |
| 2019/0108515 | A1* | 4/2019 | Lakka .................. G06Q 20/401 |

FOREIGN PATENT DOCUMENTS

| | | |
|---|---|---|
| WO | 03048906 | 6/2003 |
| WO | 2009036511 | 3/2009 |
| WO | 2018111302 | 6/2018 |

OTHER PUBLICATIONS

Application No. EP19876734.5, Extended European Search Report, Mailed On Nov. 17, 2021, 9 pages.
SG11202103704Y, "Written Opinion", Feb. 20, 2023, 10 pages.
Application No. PCT/US2019/057572, International Search Report and Written Opinion, Mailed On Feb. 10, 2020, 12 pages.
Application No. CN201980069890.2, Office Action, Mailed On Oct. 12, 2023, with English Translation, 22 pages.

* cited by examiner

VALIDATION SERVICE FOR ACCOUNT VERIFICATION

CROSS-REFERENCE TO RELATED APPLICATIONS

This application is a 371 National Phase of PCT Patent Application No. PCT/US2019/057572 filed on Oct. 23, 2019, which claims priority to U.S. Patent Application No. 62/749,304, filed on Oct. 23, 2018, the disclosures of which are herein incorporated by reference in their entirety for all purposes.

BACKGROUND

Entities often maintain accounts for users, whereby users may maintain a membership account with the entity. The membership account may allow the user to participate in services offered by the entity (e.g., a retail company, an sports organization, an entertainment theme park, etc.). These users who maintain membership accounts may also maintain different accounts with other entities (e.g., a bank, a digital currency exchange, etc.), whereby users may access a resource (e.g., from the retail company) by utilizing the different account (e.g., a bank account).

In these types of transactions, a transaction authorization procedure is often employed that involves more than one step. For example, in a typical two-step procedure, a user may first be required to authenticate their account credentials with a first entity (e.g., a retail company), for example, to make sure their membership is in good standing. Second, after verifying their membership credentials, the user may request authorization using their account credentials with a second entity (e.g., a bank) to obtain the resource. However, this procedure introduces several challenges. For example, in a case where many users are waiting in line to obtain a resource, this procedure can significantly reduce transaction processing throughput, and thus negatively impact customer satisfaction. Also, by requiring users to input more than one set of credentials, often within a time-sensitive environment for the user, the procedure increases the risk of the user's credentials being comprised. Therefore, there is a need to make these types of transactions more efficient and secure than conventional procedures.

Embodiments of the invention are directed to methods and systems of improving transaction efficiency and security where more than one entity may be involved in authorizing a transaction. Embodiments of the invention address these and other problems, individually and collectively.

SUMMARY

Embodiments of the invention are directed to secure transaction processing systems and methods.

One embodiment of the invention is directed to a method comprising: initiating an authorization process by, receiving, by a resource provider system, a portable device identifier and a cryptogram from a portable device; verifying, by the resource provider system, the cryptogram; obtaining, by the resource provider system, an authentication response indicator after verification of the cryptogram; generating, by the resource provider system and based at least in part on the authentication response indicator, an authorization request message comprising an access identifier, wherein the portable device identifier and the access identifier have different data formats; transmitting, by the resource provider system, the authorization request message to a processing computer; and receiving, by the resource provider system from the processing computer, an authorization response message comprising an authorization response indicator, wherein the authorization process is performed in real-time and is completed by receipt of the authorization response message.

Another embodiment of the invention can be directed to a resource provider system configured to perform the above described method.

Another embodiment of the invention is directed to a method comprising: receiving, by a processing computer from a resource provider system, an authentication request message comprising a cryptogram and a portable device identifier; determining, by the processing computer, that the cryptogram is authenticated; transmitting, by the processing computer, an authentication response message to the resource provider system; receiving, by the processing computer from the resource provider system, an authorization request message comprising an access identifier, wherein the portable device identifier and the access identifier have different data formats; transmitting, by the processing computer, a second authorization request message comprising the access identifier to an authorization computer; receiving, by the processing computer from the authorization computer, an authorization response message containing an authorization response indicator; and transmitting, by the processing computer to the resource provider system, a second authorization response message comprising the authorization response indicator, wherein the authorization process is performed in real-time.

Another embodiment of the invention can be directed to a processing computer configured to perform the above described method.

These and other embodiments of the invention are described in further detail below, with reference to the Figures and Detailed Description.

DETAILED DESCRIPTION

Figure 1A:
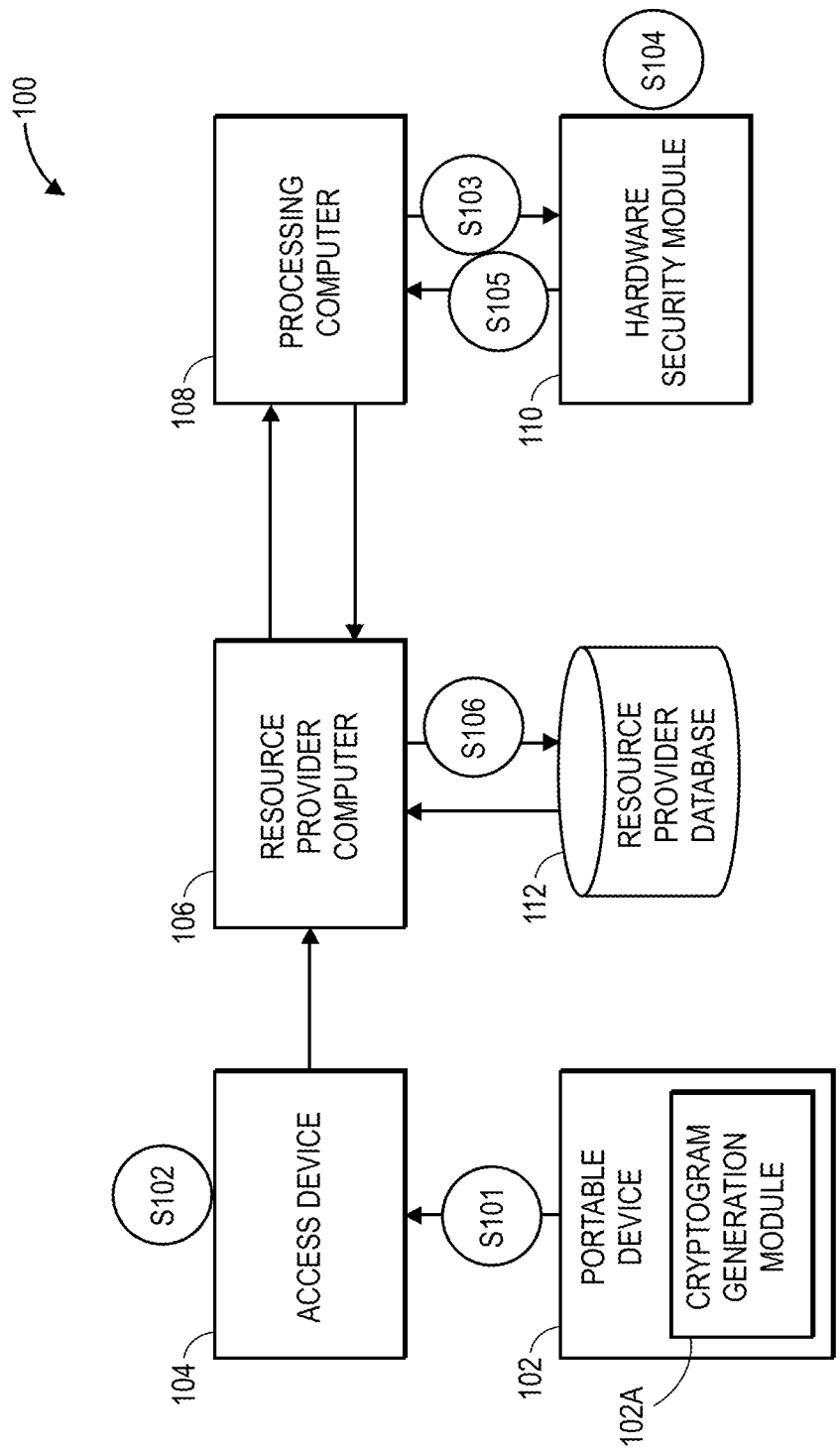
FIG. 1A shows a flow diagram of an authentication phase of an authorization process, according to embodiments of the invention.

Embodiments of the invention provide mechanisms for authorizing a secure transaction using a portable device (e.g., a mobile phone, a key fob, etc.) of a user. In some embodiments, the authorization process may include two phases: 1) an authentication phase, and 2) a transaction processing phase. In some embodiments, the authorization process may be performed in real-time. For example, in some embodiments, a real-time authorization process may include the transaction processing phase being performed immediately following the completion of the authentication phase, such that the entire authorization process is performed in less than one minute, less than ten seconds, or less than one second.

In some embodiments, the authentication phase may be performed by a resource provider system of a first entity (e.g., a retail company) that receives a cryptogram from a portable device of a user. In some embodiments, the portable device (and/or portable device identifier) may be associated with a user account of the user maintained by the first entity. The resource provider system then authenticates the portable device by verifying the cryptogram. In some embodiments, the resource provider system may transmit the cryptogram to a processing computer of a processing network (e.g., a payment processing network such as VisaNet™) for verification. The authentication phase may also include the resource provider system verifying that the user account of the user maintained by the first entity is in good standing.

Following the completion of the authentication phase, in some embodiments, the resource provider system may perform the transaction processing phase by first retrieving from a database of the resource provider system an access identifier (e.g., a primary account number (PAN)) of an account associated with the user and maintained by a second entity (e.g., an issuer bank). In some embodiments, the access identifier has a different data format from the portable device identifier, but the identifiers are associated with each other within the database of the resource provider system. The resource provider system may transmit an authorization request message containing the access identifier to the processing computer. The processing computer may process and retransmit the authorization request message to an authorization computer of the second entity for authorization. Upon the resource provider system receiving an authorization response message from the processing computer (e.g., including an authorization response indicator determined by the authorization computer), the authorization process may be completed.

In some embodiments, the cryptogram that is verified during the authentication phase may be generated based at least in part on a portable device identifier of the portable device. In some embodiments, the cryptogram may also be generated based at least in part on an intermediate access identifier. In some embodiments, the intermediate access identifier may correspond to a virtual PAN that has the same data format as the access identifier. In some embodiments, while the access identifier may be issued by an issuer and used to conduct a transaction, the intermediate access identifier may not be utilized the conduct a transaction. For example, the intermediate access identifier may be one of a plurality (e.g., a range) of intermediate access identifiers issued by a third-party (e.g., that is independent from the second entity issuer) and licensed to the first entity at least for use in performing embodiments of the present disclosure. In some embodiments, the intermediate access identifier may correspond to a key derivation parameter that is used to generate a unique derivation key (UDK) from a master derivation key (MDK). In some embodiments, the cryptogram may be generated by using the UDK to encrypt one or more data elements, including the portable device identifier. In some embodiments, one or more data elements may be transmitted to the processing computer together with the cryptogram during the authentication phase for verifying the cryptogram (e.g., the portable device identifier, the intermediate access identifier, etc.). In some embodiments, the one or more of the data elements may be determined (e.g., received and/or derived) by the processing computer prior to the authentication phase for later use during the authentication phase and/or transaction processing phase.

In some embodiments, the resource provider system may include an access device and a resource provider computer. The resource provider computer may be communicably connected to the access device (e.g., over a public or private network). In some embodiments, the access device may be a point of sale (POS) terminal or an automatic fuel dispenser (AFD) that includes a card reader. The access device may be equipped to receive a cryptogram from the portable device (e.g., via contactless communication such as near field communication (NFC)). In some embodiments, the access device may be equipped to verify the cryptogram without requiring contact with the processing computer. For example, the access device may be equipped with a hardware security module (HSM) that is loaded with cryptographic keys such that the access device may generate a cryptogram and verify the received cryptogram by comparing the generated cryptogram with the one received from the portable device. In another example, the access device may not have an HSM with cryptographic keys loaded for use in generating a cryptogram. In this example, the access device may receive a cryptogram (e.g., a digital signature) and a data element (e.g., a portable device identifier) from the portable device and then verify the digital signature utilizing a public key infrastructure (PKI). For example, the digital signature may be generated by the portable device by using a private signing key to sign a message digest (e.g., a hash of the portable device identifier). The access device may be able to verify the digital signature by computing a hash of the portable device identifier using a public verification key (e.g., using a hashing algorithm such as MD5), and then determining if the hash matches the digital signature (e.g., via bitwise comparison). In some embodiments, the public verification key may be certified (e.g., via a digital certificate) by a certificate authority and received by the access device prior to receiving the cryptogram. In some embodiments, the access device may not be equipped to verify the cryptogram. In this case, the access device may transmit the cryptogram (and one or more data elements) to the processing computer for verification (e.g., via the resource provider computer). In some embodiments, where the processing computer verifies the cryptogram, the processing computer may be equipped with an HSM module, similar to as described above. In some embodiments, verification of a cryptogram may be performed without utilizing an HSM module.

Embodiments of the invention provide for a number of technical advantages. In one non-limiting example, using conventional techniques, a user may be required to perform a plurality of steps in order to obtain authorization for a transaction. For example, in a case where a first entity and a second entity may be independent and/or unaffiliated entities, a user may first be required to authenticate their membership credentials with a first entity (e.g., a retail company), for example, by swiping a membership organization identification (ID) card, entering a personal identification number (PIN), etc. Then, after authenticating their membership credentials, the user may use another access card associated with a second entity (e.g., a debit or credit card obtained from an issuer bank) to obtain authorization for the transaction from the second entity. However, as noted above, these techniques are inefficient and reduce the security of a transaction authorization process. For example, by requiring a plurality of steps for a given transaction, conventional techniques may slow down a transaction processing pipeline, which can significantly impact aggregate system performance over a large number of user transactions. Additionally, conventional techniques that involve inputting a membership ID or PIN may be easily forged and could potentially compromise user credential information.

In contrast, embodiments of the present invention provide a more efficient transaction authorization process by enabling the user to perform a single step (e.g., tapping a portable device against an access device) to obtain authorization. For example, upon a resource provider system receiving a cryptogram from the portable device, the resource provider system may then engage in a series of operations (e.g., spanning both the transaction phase and the transaction processing phase), without requiring further user input, and resulting in the portable device being authenticated and the user's access card credentials being authorized to conduct the transaction in real-time. In another example of improving efficiency over conventional techniques, embodiments of the present disclosure may reduce the number of operations needed to perform the authorization process. For example, by utilizing an intermediate access identifier, a processing computer may act as a "stand-in" for the second entity (e.g., a bank), thus obviating the need for an authorization computer of the second entity to be involved during the authentication phase. In some cases, the processing computer may also act as a stand-in during the transaction processing phase, for example, authorizing the transaction based on the access identifier. Over a large number of transactions, this reduction in operations required may significantly save processing resources and reduce network bandwidth utilization. In another technical advantage, by enabling the authorization process to be performed over a single step and utilizing a secure cryptogram (e.g., for performing the authentication phase), embodiments of the present disclosure reduce the risk of a user's access credentials being comprised. Finally, embodiments of the present disclosure may be performed utilizing existing infrastructure (e.g., including infrastructure for processing payment transactions). For example, an existing infrastructure used for authenticating cryptograms generated by an access card (e.g., that is issued by a bank) may also be used to authenticate a portable device (e.g., that is issued by retail company).

Although examples used herein may primarily be described within a fuel servicing context (e.g., using AFDs), it should be understood that the technical advantages of the present invention are applicable to a variety of transactions. In another non-limiting example, a metro transit company may operate metro services (e.g., train lines, bus routes). The metro transit company may issue a portable device (e.g., a transit card) to a user for use of metro services operated by the metro transit company. The user may further associate the transit card with a user account at a particular issuer (e.g., the user's bank account) so that when the user taps the card, a payment transaction is executed using the user's account. A mass-transit station of a metro transit company may have one or more gates, whereby each gate is connected to a transit fare contactless reader (e.g., access device). The transit fare contactless reader may also be connected to a transit system computer (e.g., resource provider computer). In embodiments of the present disclosure, and similar to as described above in reference to the AFD example, a user may tap their portable device (e.g., metro transit card) on the AFD reader, causing the portable device to transmit a cryptogram to the reader. The transit system (e.g., including the reader and the transit system computer) may initiate an authorization process that causes the portable device to be authenticated (e.g., as a legitimate card issued by the metro transit company). Upon authenticating the card, the authorization process may further include automatically sending an authorization request message to the issuer (e.g., containing the PAN associated with the user's bank account). Upon receiving authorization, the transaction may be completed and the user may pass through the gate. It should be understood that the entire authorization process may be performed in real-time (e.g., within seconds). It should further be understood that the metro transit company and the issuer bank may not have a pre-existing relationship. For example, a portable device identifier of the portable device and an access identifier (e.g., PAN) of the user account may have different data formats and/or being unaffiliated with each other.

Prior to discussing embodiments of the invention, a description of some terms may be helpful in understanding embodiments of the invention.

A "consumer" or "user" may be an individual who acquires a good or service. In some embodiments, a consumer may be associated with one or more personal accounts and/or portable devices. The consumer may also be referred to as a cardholder or account holder, in some embodiments.

A "portable device" (or "mobile device") may be a device that can be carried by a user. Portable devices may have capabilities for storing, processing, and communicating information. They may also store credentials, for example, including payment credentials, membership credentials, or other forms of identification. A portable device may have a way of generating and/or storing cryptographic information for additional security. This may include, but is not limited to, utilizing a secure element. Examples of portable devices include laptops, mobile phones, payment cards, and key fobs. Some portable devices may be capable of contact and/or contactless communication.

A "contactless" communication may be a communication in which data is exchanged between two devices without the need for the devices to be physically coupled. Without limiting the generality of the foregoing, "contactless" communication can include data transmissions by near-field communication (NFC) transceiver, laser, radio frequency, infrared communications, or other radio frequency or wireless communication protocols such as Bluetooth, Bluetooth low-energy (BLE), Wi-Fi, iBeacon, etc.

A "secure element" may include software and/or tamper-resistant hardware that allows high levels of security. In some examples, a secure element may include a microprocessor chip which can store sensitive data and run secure applications. Such applications and/or data may be related to payment applications, authentication/authorization, cryptographic key management, and the like. For example, some or all portions of credentials, cryptographic keys or key materials, cryptograms, shared secrets, account information, and the like, may be provisioned onto the secure element of a device (e.g., a portable device) to protect against unauthorized access. In some embodiments, the secure element may include or be included in any combination of software-based (such as host card emulation or HCE) and/or hardware-based (such as a hardware security module (HSM), a smart card, or chip card) security modules.

A "hardware security module" (HSM) may be a physical device that safeguards and manages digital keys for strong authentication and provides cryptoprocessing. In some examples, an HSM may be in the form of a plug-in card or an external device that attaches directly to a computer or network server. An HSM may contain one or more secure cryptoprocessor chips.

A "portable device identifier" may include an identifier that is associated with a portable device. The portable device identifier may be a credential that is issued by an entity (e.g., a payment issuer, a membership organization, a government organization, a transit company, etc.). The portable device identifier may be represented using any suitable format, such as alphanumeric characters, alphabetic characters, numeric, text based, etc. In some cases, the portable device identifier may be associated with an account for a single user. In other cases, the portable device identifier may be associated with multiple users, for example, who may share a membership account. In some embodiments, a portable device identifier may be a membership organization ID ("membership ID"), a mass transit account number, a building access identifier, etc. In other embodiments, a portable device identifier may be a credential that is directly associated with the portable device (e.g., a portable device serial number). In this case, the portable device identifier may later be associated (e.g., linked) with another identifier (e.g., a membership ID) in a database (e.g., a membership organization database). In some embodiments, the portable device identifier may be stored and/or embedded in a hardware and/or software component of the portable device. A portable device identifier may also include a combination of fields, for example, including an account number and an email address or other user identifier. In some examples, a portable device identifier may have a different data format than another type of identifier (e.g., an access identifier, or intermediate access identifier). For example, a portable device identifier may be a 10 digit numeral, while an access identifier may be a 16, 18, or 19 digit PAN. In some examples, a portable device identifier may have the same data format as another type of identifier.

An "acquirer" may be a business entity (e.g., a financial institution) that has a business relationship with a particular merchant or other entity. Some entities can perform both issuer and acquirer functions. Some embodiments may encompass such single entity issuer-acquirers. In a payment transaction context, acquirers typically provide merchants with a bank account, and in some cases, transaction accepting infrastructure. Generally, after a transaction has been authorized and as part of the settlement process, funds are transferred from the issuer to merchant's account at the acquirer. The acquirer may also communicate payment transaction status with the merchant. The acquirer may operate an acquirer computer, which may generically be referred to as a "transport computer."

A "payment processing network" may refer to an electronic payment system used to accept, transmit, or process transactions made by payment devices for money, goods, or services. The payment processing network may transfer information and funds among issuers, acquirers, merchants, and payment device users. The payment processing network may include data processing subsystems, networks, and operations used to support and deliver authorization services, authentication services, exception file services, and clearing and settlement services. An exemplary payment processing system may include VisaNet™. Payment processing systems such as VisaNet™ are able to process credit card transactions, debit card transactions, and other types of commercial transactions. Authorization, settlement, and clearing may be done at the same time (substantially simultaneously, e.g., within a few minutes or hours) or may be done as part of a batch settlement process (e.g., at the end of the day or week). The payment processing network may include a server computer (e.g., a "processing computer").

An "authorization process" may be a process that results an authorizing a transaction. An authorization process may include more than one phase. For example, an authorization process may include an authentication phase, in which one or more portable devices of a user are verified to be valid. An authorization process may also include a transaction processing phase. In some examples, the transaction processing phase may proceed after successful completion of the authentication phase. The transaction processing phase may include transmission of messages between one or more entities in a network (e.g., a payment processing network) to process a transaction. In some examples, the entire authorization process may be performed in substantially real-time. As discussed herein, "real-time" may correspond to a process being performed within milliseconds or seconds so that a processing result (e.g., transaction approval) is available virtually immediately as feedback. For example, in some embodiments, the entire authorization process may be performed in less than five minutes, less than one minute, less than ten seconds, less than five seconds, or less than one second.

A "terminal" may be a device at which a consumer enters data into a computer system. A point of sale (POS) terminal can allow the consumer to enter their payment information. Information may be entered into a terminal by means including a keypad, a stylus on a screen, and a contactless interface.

A "card-on-file transaction" may be a transaction where a service provider uses payment credentials from a consumer that have been previously stored. A card-on-file transaction may also be called a credential-on-file transaction. A card-on-file transaction may be used, for example, for installment payments or for the convenience of the merchant or consumer.

A "pre-authorization" may be an authorization performed before the authorization of a transaction. A pre-authorization may involve a hold placed on a balance in a consumer's account. Pre-authorizations may be done to verify that valid payment credentials have been presented before providing a resource when the total amount of the transaction is not yet known, such as when booking a hotel or paying for fuel at an automated pump. Pre-authorizations may also be used when there is a lag between the authorization and settlement steps of a transaction.

An "authentication request message" may be a message that is sent to request authentication of a portable device and/or credentials. The authentication request message may be sent to any suitable entity for authentication, including, by way of example, an issuing financial institution, a payment processing network, a resource provider system, a cryptocurrency network, a payment processor, and/or an automated clearing house. In an example involving a payment processing network, the payment processing network may receive an authentication request message and authenticate a portable device on behalf of a resource provider that provisions a portable device to a user. In some cases, for example where an intermediate access identifier is used for authentication (e.g., instead of an access identifier originally issued by an issuer of a payment card), the payment processing network may "stand-in" for the issuer during authentication. In some cases, an authentication request message may contain one or more data elements, including, but not limited to, a cryptogram (e.g., an Authorization Request Cryptogram (ARQC)), an access identifier, an intermediate access identifier, a portable device identifier, authentication data, transaction information, etc. In some examples, a resource provider system (e.g., via an access device or resource provider computer) may receive, transmit, and/or process an authentication request message.

An "authentication response message" may be a message reply to an authentication request message. The authentication response message may be generated, for example, by an issuing financial institution, a payment processing network, a resource provider system, a cryptocurrency network, a payment processor, and/or an automated clearing house. The authorization response message may include, for example, one or more of the following status indicators: Approval—authentication was successful; Decline—authentication was unsuccessful. The authentication response message may also include an authentication result code, which may be a code that an entity (e.g., a payment processing network) returns in response to an authentication request message in an electronic message (either directly or through the payment processing network) to the merchant's access device (e.g., POS equipment) that indicates authorization was successful. The code may serve as proof of authentication. In some cases, another cryptogram (e.g., an Authorization Response Cryptogram (ARPC)) may also be generated to serve as proof of authentication.

An "authorization request message" may be a message that is sent to request authorization for a transaction. An authorization request message may be sent, for example to a payment processing network, an issuer of a payment card, a payment processor, a cryptocurrency network, and/or an automated clearing house. An authorization request message according to some embodiments may comply with ISO 8583, which is a standard for systems that exchange electronic transaction information associated with a payment made by a user using a payment device or payment account. The authorization request message may include an access identifier such as an issuer account identifier (e.g., PAN) that may be associated with a payment device or payment account. An authorization request message may also comprise additional data elements corresponding to "identification information" including, for example, a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction. These data elements may be stored in any suitable data field(s) of the authorization request message. For example, a transaction amount may be stored in a value data field that is set to either zero or a positive numeral. In some embodiments, the data elements (e.g., the format) of an authorization request message may be similar or identical to the data elements of an authentication request message (although the values of each data element/field may be different).

An "authorization response message" may be a message reply to an authorization request message. The authorization response message may be generated, for example, by an issuing financial institution, a payment processing network, a cryptocurrency network, a payment processor, and/or an automated clearing house. The authorization response message may include, for example, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g., POS equipment) that indicates approval of the transaction. The code may serve as proof of authorization. As noted above, in some embodiments, a payment processing network may generate or forward the authorization response message to the merchant.

A "server computer" is typically a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "resource provider" can be any suitable entity that provides resources (e.g., goods, services, access to secure data, access to locations, or the like) during a transaction. For example, a resource providing entity can be a merchant, a venue operator, mass transit operator, a building owner, a governmental entity, etc. A "merchant" may be an entity that engages in transactions and can sell goods or services, or provide access to goods or services.

A "resource provider system" may be include one or more computational apparatuses of a resource provider. The one or more computational apparatuses may be communicably connected together (e.g., over a network) to perform operations of the system. In some examples, a resource provider system may include one or more access devices that are connected to a resource provider computer. The resource provider computer may be a server computer. The composition and distribution of computational apparatuses (e.g., access devices, resource provider computers) that form the resource provider system may be determined in any suitable manner. For example, a resource provider system may include a single computational device that performs functions of an access device and a resource provider computer. In some cases a resource provider system (e.g., an access device of the system) may have a secure element that is implemented in hardware and/or software. The secure element may be utilized for generating and/or verifying cryptograms, storing cryptographic keys, etc.

"Authentication data" may include any data suitable for authenticating a user or device. Authentication data may be obtained from a user or a device that is operated by the user. Examples of authentication data obtained from a user may include PINs (personal identification numbers), biometric data, passwords, etc. Examples of authentication data that may be obtained from a device may be include device serial numbers, portable device identifiers, hardware secure element identifiers, device fingerprints, phone numbers, International Mobile Equipment Identity (IMEI) numbers, cryptograms, etc.

"Access data" may include any suitable data that can be used to access a resource or create data that can access a resource. In some embodiments, access data may be account information for a payment account. Account information may include an access identifier (e.g., a PAN (primary account number)), payment token, expiration date, verification values (e.g., CVV, CVV2, dCVV, dCVV2), etc. In other embodiments, access data may be data that can be used to activate account data. For example, in some cases, account information may be stored on a mobile device, but may not be activated until specific information is received by the mobile device. In other embodiments, access data could include data that can be used to access a location. Such access data may be ticket information for an event, data to access a building, transit ticket information, etc. In yet other embodiments, access data may include data used to obtain access to sensitive data. Examples of access data may include codes or other data that are needed by a server computer to grant access to the sensitive data.

An "access identifier" may include an identifier used by a user to obtain access to a resource. The access identifier may be an original credential that is issued by an issuer entity. An access identifier may be in any suitable format, such as alphanumeric characters, alphabetic characters, numeric, text based, etc. In some cases, the access identifier may be associated with an account for a single user. In other cases, the access identifier may be associated with multiple users, for example, who may share an account. Examples of an access identifier may include an original PAN or a token (e.g., a payment token). Other examples may include a mass transit account number, a building access identifier, etc. An access identifier may also include a combination of fields, for example, including an email address or other user identifier.

An "intermediate access identifier" may include an identifier that can be used as an intermediary in a process. For example, an intermediate access identifier may be used as input to generate a cryptogram. The intermediate access identifier may be represented in any suitable format, such as alphanumeric characters, alphabetic characters, numeric, text based, etc. In some cases, the intermediate access identifier may be associated with a single user or with multiple users, for example, who may share an account. In some embodiments, the intermediate access identifier may be capable of being used to conduct a transaction. In other embodiments, the intermediate access identifier may be incapable of being used to conduct a transaction. For example, an intermediate access identifier may include a virtual PAN that is mapped to an access identifier (e.g., a PAN). In some cases, the intermediate access identifier is 16, 18, or 19 digits long and may resemble a real PAN, but may not be used to conduct a transaction. In other cases, for example, in a case where the intermediate access identifier is a payment token (or mapped to a payment token), the intermediate access identifier may be used to conduct a transaction. In some cases, the intermediate access identifier may have a different data format than other identifiers (e.g., a portable device identifier and/or access identifier). In some cases, an intermediate access identifier may be issued (e.g., licensed) by any suitable entity to another entity. For example, an acquirer entity may license a bank identification number (BIN) (or a range of unique BINs) to a service provider entity. Each licensed BIN may correspond to an intermediate access identifier, that may in turn be assigned to a user. The intermediate access identifier may also be initially unassociated with other identifiers, and then later become associated with one or more other identifiers (e.g., a portable device identifier and/or access identifier).

An "access request" may include a request for access to a resource. The resource may be a physical resource (e.g., good), digital resources (e.g., electronic document, electronic data, etc.), or services. In some cases, an access request may be submitted by transmission of an access request message (e.g., an authorization request message) that includes access request data. Typically a device associated with a requestor may transmit the access request message to a device associated with a resource provider.

"Access request data" may include any information surrounding or related to an access request. Access request data may include access data. Access request data may include information useful for processing and/or verifying the access request. For example, access request data may include details associated with entities (e.g., resource provider computer, processor server computer, authorization computer, etc.) involved in processing the access request, such as access identifiers, tokens, entity identifiers (e.g., name, etc.), location information associated with the entities, and information indicating the type of entity (e.g., category code). Exemplary access request data may include information indicating an access request amount, an access request location, resources received (e.g., products, documents, etc.), information about the resources received (e.g., size, amount, type, etc.), resource providing entity data (e.g., resource provider data, document owner data, etc.), user data, date and time of an access request, a method utilized for conducting the access request (e.g., contact, contactless, etc.), and other relevant information. Access request data may also be known as access request information, transaction data, transaction information, or the like.

An "access device" may be any suitable device for providing access to an external computer system. An access device may be in any suitable form. Some examples of access devices include point of sale (POS) devices, cellular phones, PDAs, personal computers (PCs), tablet PCs, handheld specialized readers, set-top boxes, electronic cash registers (ECRs), automated fuel dispensers (AFDs), automated teller machines (ATMs), virtual cash registers (VCRs), kiosks, security systems, access systems, Websites, and the like. An access device may use any suitable contact or contactless mode of operation to send or receive data from, or associated with, a mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a mobile device.

An "application" may be a computer program that is used for a specific purpose. Examples of applications may include transit applications, secure data access applications, banking applications, digital wallet applications, etc.

An "electronic wallet" or "digital wallet" can include an electronic device that allows an individual to conduct electronic commerce transactions. A digital wallet may store user profile information, credentials, bank account information, one or more digital wallet identifiers and/or the like and can be used in a variety of transactions, such as, but not limited to, eCommerce transactions, social network transactions, money transfer/personal payment transactions, mobile commerce transactions, proximity payment transactions, gaming transactions, etc. A digital wallet may be designed to streamline the purchase and payment process. A digital wallet may allow the user to load one or more payment cards onto the digital wallet so as to make a payment without having to enter an account number or present a physical card.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc. Other examples of credentials include PANs (primary account numbers), PII (personal identifiable information) such as name, address, and phone number, and the like.

An "authorizing entity" may be an entity that authorizes a request, typically using an authorization computer to do so. An authorizing entity may be an issuer, a governmental agency, a document repository, an access administrator, etc.

An "issuer" may typically include a business entity (e.g., a bank, a digital currency exchange, etc.) that maintains an account for a user. An issuer may also issue payment credentials stored on a user device or portable device, such as a cellular telephone, smart card, tablet, or laptop to the user. The issuer of a particular consumer account may determine whether or not to approve or deny specific transactions. An issuer may authenticate a consumer and release funds to an acquirer if transactions are approved (e.g., a consumer's account has sufficient available balance and meets other criteria for authorization or authentication).

A "service provider" may be an entity that can provide a resource such as goods, services, information, and/or access typically through a service provider computer. Examples of a service provider includes merchants, digital wallets, payment processors, etc.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an access identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "key" may include a piece of information that is used in a cryptographic algorithm to transform data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), RSA asymmetric encryption etc. An "encryption key" may include any data value or other information suitable to cryptographically encrypt data. A "decryption key" may include any data value or other information suitable to decrypt encrypted data. In some cases, the same key used to encrypt data may be operable to decrypt the data. Such a key may be known as a symmetric encryption key.

A "unique derivation key" (UDK) may include any key used to encrypt or decrypt data to be securely communicated. In some cases, a UDK may be generated from a shared secret known both to a sending entity and a receiving entity. In some cases, the shared secret may be a Master Derivation Key (MDK), which is then used to derive a UDK. For example, a UDK may be derived from an MDK using a key derivation function (KDF) and one or more key derivation parameters that are input to the KDF. The one or more key derivation parameters may include, for example, static data elements (e.g., an access identifier, a portable device identifier, etc.) and/or dynamic data elements (e.g., a randomly generated number, an application transaction counter (ATC), etc.). The key derivation parameters may also include, for example, instructions (or an algorithm) for combining data elements by the KDF to generate the UDK. In some cases a UDK may correspond to a cryptographic key that may be used to generate a cryptogram. In some cases, a UDK may correspond to a limited use key (LUK), while in other cases a UDK may correspond to a single use key (SUK).

A "limited use key" (LUK) may include any encryption key or other data that may be used a limited number of times. An LUK may be used for any suitable purpose. For example, in some embodiments, an LUK may be used to generate a cryptogram for a transaction.

A "single use key" (SUK) is a LUK that can be only used once. For example, a SUK may be used to encrypt and/or decrypt data related to a single transaction. In some embodiments, a SUK can be derived from a LUK.

A "cryptogram" may include any data element or other information used to authenticate an entity such as a device or a user. For example, a cryptogram may comprise static (i.e., predetermined) data, dynamic data, or a combination of the two that is encrypted using an encryption key (e.g., an LUK). A cryptogram may be used in any suitable context. For example, a cryptogram may be used to authenticate a portable device issued by an entity (e.g., an issuer, a membership organization, etc.). In some embodiments, a cryptogram may also be used during a transaction processing phase (e.g., to verify an access card). In some examples, a cryptogram may be used to authenticate more than one credential (e.g., an access identifier and a portable device identifier), respectively, corresponding to more than one entity.

A "certificate authority" (CA) may be an entity that issues and/or manages digital certificates. A digital certification may certify the ownership of a public key by the named subject of the certificate. A certificate authority may act as a trusted third party that is trusted by the subject of a certificate and by the party relying on upon the certificate.

A "public key infrastructure" (PKI) may be a set of roles, policies, hardware, software and procedures needed to create, manage, distribute, use, store, and/or revoke digital certificates and manage public key encryption. A PKI may include one or more entities, including, for example, a certificate authority, a registration authority, a central directory, a certificate management system, and a certificate policy. A PKI may manage digital certificates (e.g., using an X.509 standard) that are used to verify that a particular public key belongs to a certain entity. For example, a PKI may be used by an access device to verify that a public verification key, which may be used to verify a cryptogram (e.g., digital signature) received from a portable device, is a valid public verification key that is associated with the issuer of the portable device.

Figure 1B:
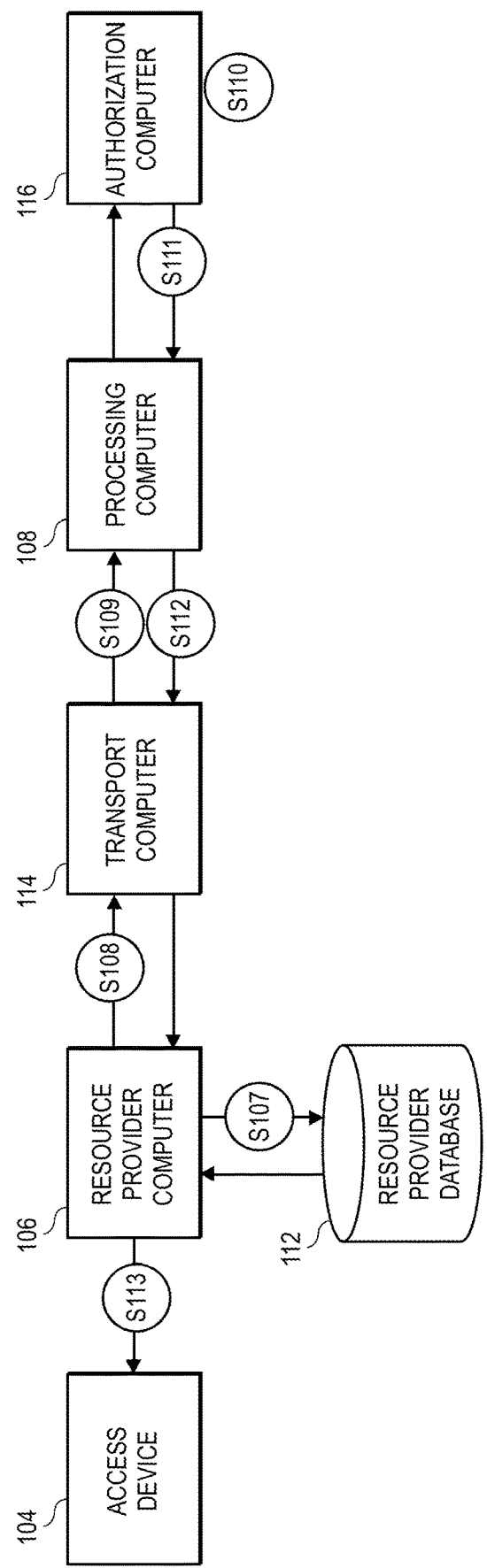
FIG. 1B shows a flow diagram of a transaction processing phase of an authorization process, according to embodiments of the invention.

FIGS. 1A and 1B respectively depict different phases of an authorization process for a transaction according to embodiments of the invention. FIG. 1A shows a system diagram and a method depicting an authentication phase of the authorization process, while FIG. 2A shows a system diagram and a method depicting a transaction processing phase of the authorization process that follows a successful completion of the authentication phase.

Turning to FIG. 1A, a block diagram of system 100 for authenticating a portable device is depicted. The system 100 comprises a portable device 102, an access device 104, a resource provider computer 106, a processing computer 108, a hardware security module 110, and a resource provider database 112. The portable device 102 contains a cryptogram generation module 102A that may be used to generate cryptograms for use in authenticating the portable device 102.

In some embodiments, each of the elements of FIGS. 1A and 1B may be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like. Also, in some embodiments, the portable device 102 may be in operative communication with the access device 104 and/or resource provider computer 106 through contactless communication.

In some embodiments, the portable device 102 may correspond to any suitable device (e.g., a key fob or a mobile phone). For example, consider a scenario in which the resource provider is retail organization that provides services and/or goods to members who are subscribed to the organization. The portable device 102 may be correspond to a physical device such as a key fob that is provisioned to members of the retail organization for use in executing transactions. The portable device 102 may include a cryptogram generation module 102A that may be used for generating a cryptogram, discussed further below in reference to FIG. 3. In some embodiments, the cryptogram generation module 102A may execute within a secure element of the portable device 102. In other embodiments, the cryptogram generation module 102A may generate a cryptogram independently of whether the portable device 102 has a secure element. In some embodiments, the portable device 102 may correspond to a mobile phone. In this scenario, instead of provisioning an actual hardware device to a user, the retail organization may provision a portable device identifier (and/or an associated token) to the portable device 102 for use in performing embodiments of the present disclosure. For example, the token may be stored by a digital wallet application on the phone and used for generating a cryptogram to authenticate the mobile phone.

In some embodiments, the access device 104 and the resource provider computer 106 may be components of a resource provider system of a resource provider. Continuing with the example above, one of the services of the retail organization may include providing fuel to members who wish to service their vehicles at a fuel dispenser (e.g., an AFD). In this scenario, each AFD may correspond to the access device 104 of FIG. 1. Additionally, each of the AFDs may be connected (e.g., over a public or private network) to a server computer that is in a different location from the AFDs (e.g., the organization's headquarters), and which may correspond to resource provider computer 106. In some embodiments, the functions of the resource provider computer 106 and the access device 104 may be included within a single computational unit that corresponds to the resource provider system. For example, a resource provider computer 106 may be stored on-premises in a smaller grocery store, and may also provide functionality of an access device 104. Although, as described herein, particular functions are attributed to either the access device 104 (e.g., FIG. 4) or the resource provider 106 (e.g., FIG. 5), it should be understood that one or more of these functions may be performed by either or both of these devices, based at least in part on a suitable context.

In some embodiments, the access device 104 of the resource provider system may receive a cryptogram from the portable device 102. In some embodiments, the access device 104 may verify the cryptogram locally (e.g., within a secure element). In other embodiments, the access device 104 (e.g., via the resource provider computer 106) may transmit the cryptogram, along with one or more data elements, within an authentication request message to the processing computer 108 for verification. The processing computer 108 may be a server computer that is part of a payment processing network. In some embodiments, as part of the authentication phase, the processing computer 108 may perform verification of the cryptogram and authenticate the portable device 102. As depicted in FIG. 1, the processing computer 108 may be connected to an hardware security module 110, which may function as a secure element that performs verification of the cryptogram. After verifying the cryptogram, the processing computer 108 may return an authentication response message to the resource provider computer 106. The authentication response message may contain an authentication response indicator that indicates the authentication was successful (or, in the case of unsuccessful verification, was denied). In some embodiments, the authentication response message may also include a code that serves as a proof of authentication.

In some embodiments, the resource provider database 112 may be a database server that is connected to the resource provider computer 106. In some embodiments, the resource provider database 112 may be directly coupled to the resource provider computer 106 and/or coupled to a Web server. The resource provider database 112 may store in the database a mapping between one or more data elements. For example, the resource provider database 112 may store a mapping between a portable device identifier (e.g., a membership ID), an access identifier, an intermediate access identifier, and/or any other suitable identifiers or credentials. As described below, these mappings may be used to perform the authentication process and the transaction processing phase.

Turning to FIG. 1B, a block diagram of the system 100 depicting the transaction processing phase is shown. The system 100 in FIG. 1B comprises access device 104, resource provider computer 106, a transport computer 114, processing computer 108, resource provider database 112, and an authorization computer 116. While some of the elements from FIG. 1A are not depicted in 1B (e.g., the portable device 102, hardware security module 110), it should be understood that this is for clarity of illustration only (e.g., to depict elements being used within a given phase). The authorization process that includes both phases may occur in real-time, and therefore, all of the elements may be present during the authorization process.

As depicted in FIG. 1B, and after completion of the authentication phase of FIG. 1A, the resource provider computer 106 may retrieve an access identifier from the resource provider database 112 to be included in an authorization request message. In a series of message transmissions, the authorization request message may be sent to an authorization computer 116 of an issuer that provided the access identifier to the user. In the embodiment depicted in FIG. 1B, the authorization request message may be transmitted to transport computer 114, which may be associated with an acquirer (e.g., bank) of the resource provider. The transport computer 114 may further transmit the authorization request message to the processing computer 108 (e.g., of the payment processing network affiliated with the acquirer). The processing computer 108 may further transmit the authorization request message (e.g., a second authorization request message) to the authorization computer 116, which may authorize the transaction based at least in part on the access identifier. In some embodiments, the authorization request messages may contain other data elements in addition to the access identifier (e.g., transaction information). In some embodiments, the authorization request message may be encrypted. Upon authorization, the authorization computer 116 may transmit an authorization response message to the resource provider system (e.g., access device 104). Upon a successful authorization, the transaction may be executed.

Prior to discussing the respective methods depicted in FIGS. 1A and 1B, a more detailed description of components of the system may be helpful in understanding embodiments of the invention.

Figure 2:
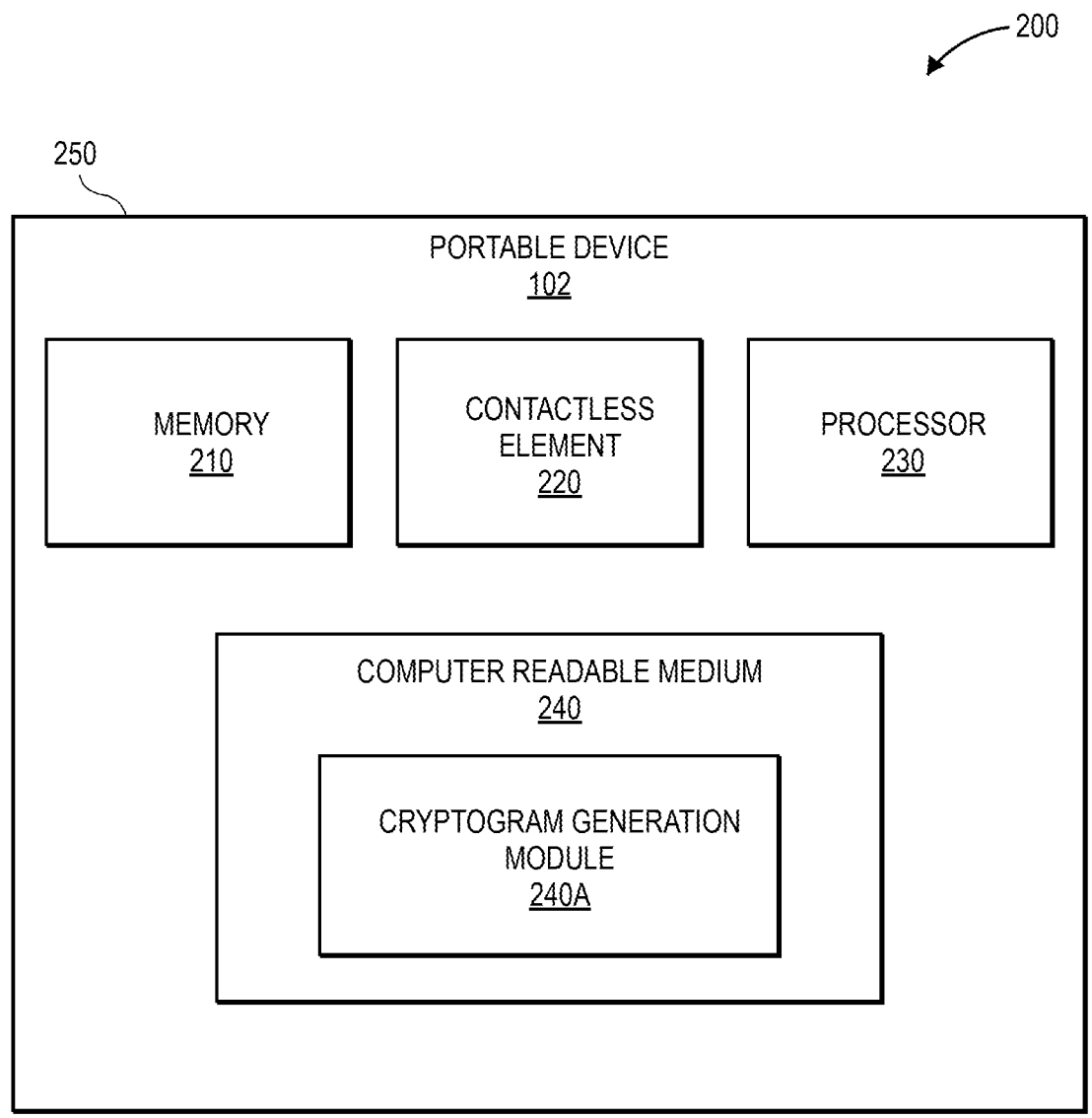
FIG. 2 shows a block diagram of a portable device of the system according to embodiments of the invention.

FIG. 2 shows a block diagram of a portable device 102 of the system according to an embodiment of the invention. In some embodiments, the portable device 102 may be a communication device (e.g., a mobile phone or a key fob) that can be used to make payments or a device which can allow a user to gain access to a location. The exemplary portable device 102 may comprise a computer readable medium 240 and a memory 210 that can be present within the body 250 of the portable device 102. The body 250 may be in the form a plastic substrate, housing, or other structure. In some cases, the memory 210 may be a secure element, and/or may also store information such as access data such as access identifiers (e.g., PANs), intermediate access identifiers, a portable device identifier, tickets, etc. Information in the memory 102-C may be transmitted by the portable device 102 to another device using an antenna (not shown) or contactless element 220.

In some embodiments, the contactless element 220 may be implemented in the form of a semiconductor chip (or other data storage element) with an associated wireless transfer (e.g., data transmission) element, such as an antenna. Data or control instructions that are transmitted via a cellular network may be applied to the contactless element 220 by means of a contactless element interface (not shown). Contactless element 220 may be capable of transferring and receiving data using a short range wireless communication capability (e.g., near field communication, Bluetooth technology). Thus, the portable device 102 may be capable of communicating and transferring data or control instructions via both cellular network (or any other suitable wireless network—e.g. the Internet or other data network) and short range communications.

The portable device 102 may also include a processor 230 (e.g., a microprocessor) for processing the functions of the portable device 102. In some embodiments, for example, in the case of a mobile phone, the portable device 102 may include a display to allow a user to view information. The portable device 102 may further include input elements (e.g., a touchscreen, keyboard, touchpad, sensors such as biometric sensors, etc.), a speaker, and a microphone.

The computer readable medium 240 may comprise one or more modules, executable by the processor for implementing methods according to embodiments. The cryptogram generation module 240A may comprise code that causes the processor to generate a cryptogram. In some embodiments, some portions or all of the cryptogram generation module 240A may be executed within a secure element of the portable device 102. For example, the secure element may store one or more cryptographic keys to be used in generating the cryptogram. The secure element may also be used in generating the cryptogram. In some embodiments, the cryptogram generation module 240A may be similar to cryptogram generation module 102A of FIG. 1A.

Figure 3:
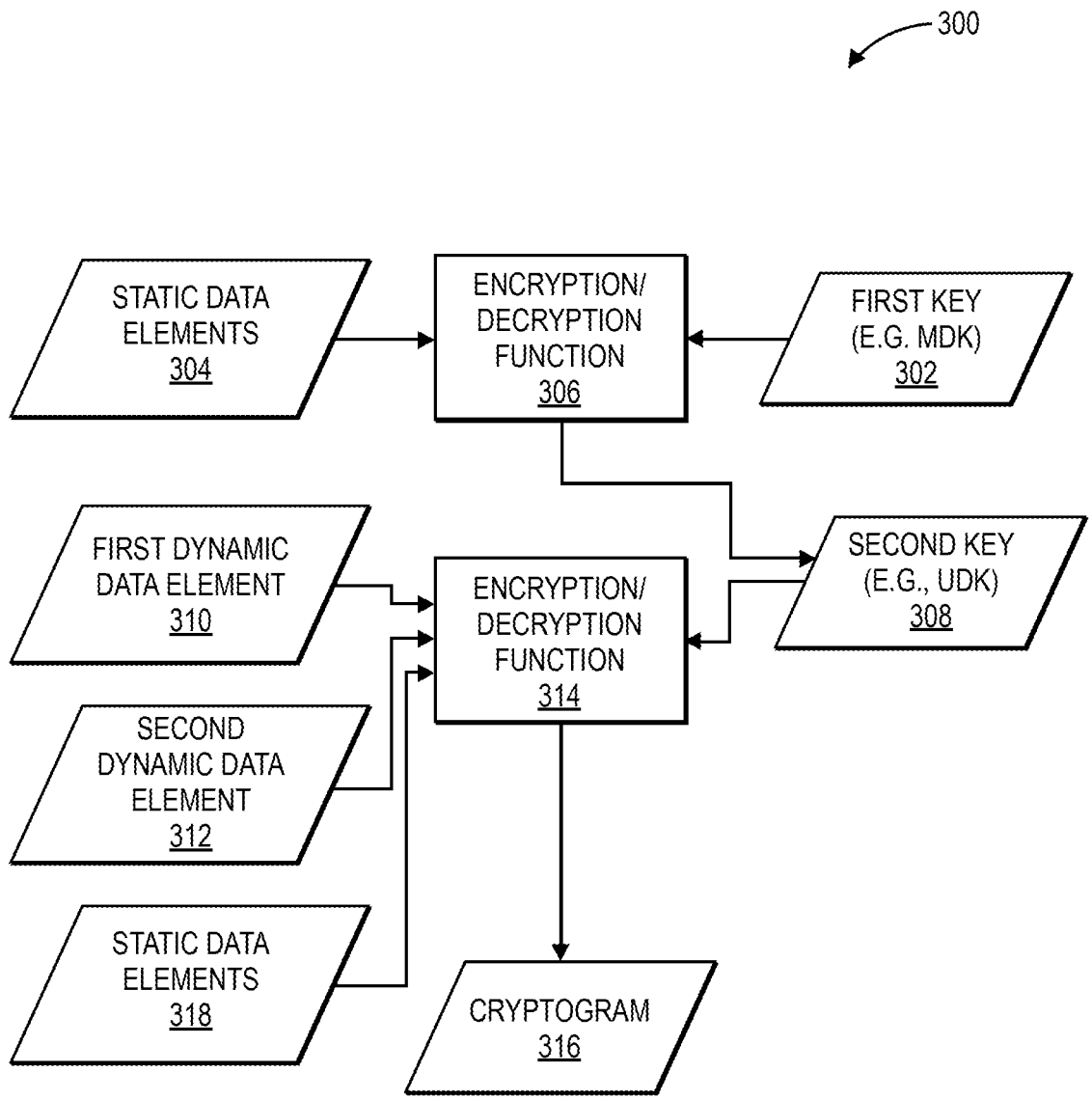
FIG. 3 shows a block diagram of the encryption process for generating a cryptogram according to embodiments of the invention.

In some embodiments, the functions of the cryptogram generation module 240A may be performed as depicted in FIG. 3. FIG. 3 shows a flow diagram of a process whereby a portable device 102 generates a cryptogram according to one embodiment. Although the processing of generating a cryptogram is described below in the context of portable device 102 generating the cryptogram, it should be understood that other devices of the system may utilize a similar process for generating a cryptogram. For example, the processing computer 108 may generate a cryptogram using a similar process that may be used to verify the cryptogram that was generated by the portable device 102. It should also be understood that, although the cryptogram generation process of FIG. 3 describes one embodiment for generating a cryptogram, any suitable method may be used for generating a cryptogram. For example, a cryptogram may be generated as described in the EMV (Europay-MasterCard-Visa) 4.3 Integrated Circuit Card Specifications for Payment Systems, Book 2, section 8.

In some embodiments, cryptogram generation process 300 may begin by the portable device 102 encrypting static data elements 304 with a first cryptographic key (e.g., first encryption key 302) on the portable device 102, using an encryption function 306 to generate a second encryption key 308. In some embodiments, the first encryption key 302 may correspond to a master derivation key. The first encryption key 302 may be a shared secret key that is maintained at the portable device 102 and at the processing computer 108

(e.g., and/or potentially also at the access device 104, if the access device 104 performs verification of the cryptogram). In some embodiments, the first encryption key 302 may be provided by an issuer, acquirer, or other financial institution that is associated with the resource provider.

In some embodiments, the first encryption key 302 may be associated with a range of PANs. For example, a range of PANs may be licensed by the resource provider from an associated entity (e.g., an acquirer bank). The acquirer bank may have a unique BIN that is included within PANs issued by the acquirer bank, and thus, the licensed range of PANs may be unique among other resource providers. In some embodiments, these PANs may be intermediate access identifiers (e.g., virtual PANs) that are not operable for being used to directly conduct a transaction, but rather may be used to facilitate the cryptogram verification process. For example, the resource provider may already have a pre-existing relationship with the payment processing network whereby the payment processing network processes transactions for the resource provider. Additionally, the payment processing network may already have an existing infrastructure for generating cryptograms using access identifiers (e.g., PANs) that are associated with user accounts at an issuer bank. These cryptograms may be used to, for example, to authenticate an access card. However, in some embodiments, the authentication of the portable device 102 may not require an issuer to be involved in the process, since the portable device 102 may be provisioned to a user (e.g., by the resource provider) independently of the user's account at the issuer bank. Thus, the resource provider may license a range of intermediate access identifiers that have the same data format as an access identifier (e.g., a 16 digit PAN), but otherwise are unaffiliated with the issuer bank, whereby existing infrastructure may be used for cryptogram generation and authentication of the portable device 102. In this way, the payment processing network (e.g., processing computer 108) may perform "stand-in" processing (STIP) to authenticate a portable device by verifying a cryptogram, without requiring message exchanges involving the issuer bank. As described above, this may result in significant improvement in efficiency with respect to processor resources, network bandwidth utilization, and overall transaction processing efficiency. In some embodiments, each portable device 102 provisioned to the user by the resource provider may be associated with an intermediate access identifier licensed by the resource provider. It should be understood that, although embodiments described herein describe access identifiers and/or intermediate access identifiers as having a PAN format, embodiments of the present disclosure should not be construed to be so limiting. It should also be understood that, in some embodiments, the intermediate access identifier may be operable for conducting a transaction. For example, the intermediate access identifier may be a payment token associated with an access identifier (e.g., PAN). The payment token may be issued and/or managed by a third party (e.g., the processing computer 108 of the payment processing network) on behalf of the issuer (e.g., the authorization computer 116). In this example, the intermediate access identifier may be suitable to be used both for stand-in verification of a cryptogram to verified during the authentication phase and for stand-in authorization of the transaction during the transaction processing phase.

In some embodiments, the static data elements 304 may include information that is stored on the portable device 102 (e.g., within the secure element and/or memory 210) such as an intermediate access identifier (e.g., a virtual PAN, as described above), a portable device identifier, and/or an Application Interchange Profile (AIP). It should be understood that one or more of the static data elements 304 may correspond to data elements of a particular Cryptogram Version Number (CVN) (e.g., number 18) of the Visa Integrated Circuit Card Specification (VIS). In some embodiments the portable device identifier may have a different data format than an intermediate access identifier and/or an access identifier. For example, the portable device identifier may be a 10 digit numeric value that is determined by the resource provider. The portable device identifier may be internally managed by the resource provider and may be labeled as Issuer Application Data (IAD). In some embodiments, the static data elements 304 may also include user account-identifying information such as a token or an access identifier. In some embodiments, the static data elements 304 may include information that is received by the portable device 102 from the access device 104 for generating the cryptogram, including, but not limited to, a transaction amount, a terminal country code, Terminal Verification Results (TVR), a transaction currency code, a transaction data, a transaction type, an unpredictable (e.g., random) number, etc. In some embodiments, because no actual transaction is being performed when authenticating the portable device via the cryptogram, one or more of the static data elements 304 may have a value data field set to zero or empty (e.g., the transaction amount).

In some embodiments, the static data elements 304 may function as key derivation parameters and may be used as input to encryption function 306. The encryption function 306 may operate as a key derivation function to be used in generating the second encryption key 308 (e.g., a unique derivation key). For example, the intermediate access identifier (e.g., associated with and stored on the portable device 102) may correspond to a key derivation parameter that is input to the encryption function 306. In some embodiments, any suitable arrangement of static data elements 304 may be used as input to the key derivation function. For example, the intermediate access identifier may be concatenated with other account identifying information and/or user identifying information. In some embodiments, an inverted version of the concatenation may be input to the key derivation function.

In some embodiments, the second encryption key 308 being generated from the static data elements 304 may include multiple portions that are each generated from different variations of the static data elements 304. For example, the second encryption key 308 may be divided into two portions. The first portion of the second encryption key 308 may be generated by encrypting the static data elements 304 using the first encryption key 302. The second portion of the second encryption key 308 may be generated by inverting the static data elements 304 and encrypting the inverted information using the first encryption key 302. The encryption function 306 used to generate the second encryption key 308 may be, for example, triple data encryption standard (TDES) or other suitable encryption algorithms, and may use an initial chaining vector of binary zeros. As described above, in some embodiments, the second encryption key 308 generated from the static data elements 304 may correspond to a unique derivation key for the account.

In some embodiments, cryptogram generation process 300 may continue by inputting at least two dynamic data elements 310, 312 to be encrypted using encryption function 314 using the second encryption key 308. The encryption function 314 used to generate the cryptogram 316 may be, for example, triple data encryption standard (TDES) or other suitable encryption algorithms. By using at least two (or more) dynamic data elements to create a cryptogram, it is highly unlikely that a skimmer can determine the cryptogram. In some embodiments, examples of dynamic data elements may include an application transaction counter (ATC) (e.g., input from the portable device 102), a dynamic data element received from the access device 104 (e.g., a random number), a time of day, etc. The dynamic data elements are dynamic in the sense that they change frequently, such as with each transaction or nearly each transaction, or at frequent time intervals (e.g., every day or every few days). It should be understood that, although in some exemplary embodiments, at least two dynamic data elements are used as input to form the cryptogram, in some embodiments only one dynamic data element may be used as input.

In some embodiments, static data elements 318 (e.g., a numeric string of predetermined length) may also be used as input to encryption function 314. In some embodiments, static data elements 318 may be generated from one or more elements described above in reference to static data elements 304 (e.g., the portable device identifier). In an example, the static data elements 318 may be created by concatenating the first dynamic data element 310 (e.g., ATC) with the leftmost digits of the portable device identifier. This numeric string may further be concatenated on the right with the second dynamic data element 312 (such as a randomly generated number received from the access device 104) to produce a concatenated value. If necessary, padding characters are concatenated on the right of the concatenated value to form a numeric string with a predetermined fixed length. This numeric string may be encrypted by encryption function 314 by using the second encryption key 308. In some embodiments, this numeric string may be bisected into two blocks. Also, in some embodiments, encryption/decryption function 314 may further encompass a series of sub-steps (not shown). In these sub-steps, the two blocks resulting from the bisection of the numerical string may each be encrypted and/or decrypted using one or both portions of the divided second encrypted key 308, and/or exclusively OR'd (XOR) with the resulting blocks. In some embodiments, one or more of the sub-steps may further include truncating one or more digits from the numerical string, for example, according to a key derivation parameter. This series of sub-steps may produce the cryptogram 316.

Figure 4:
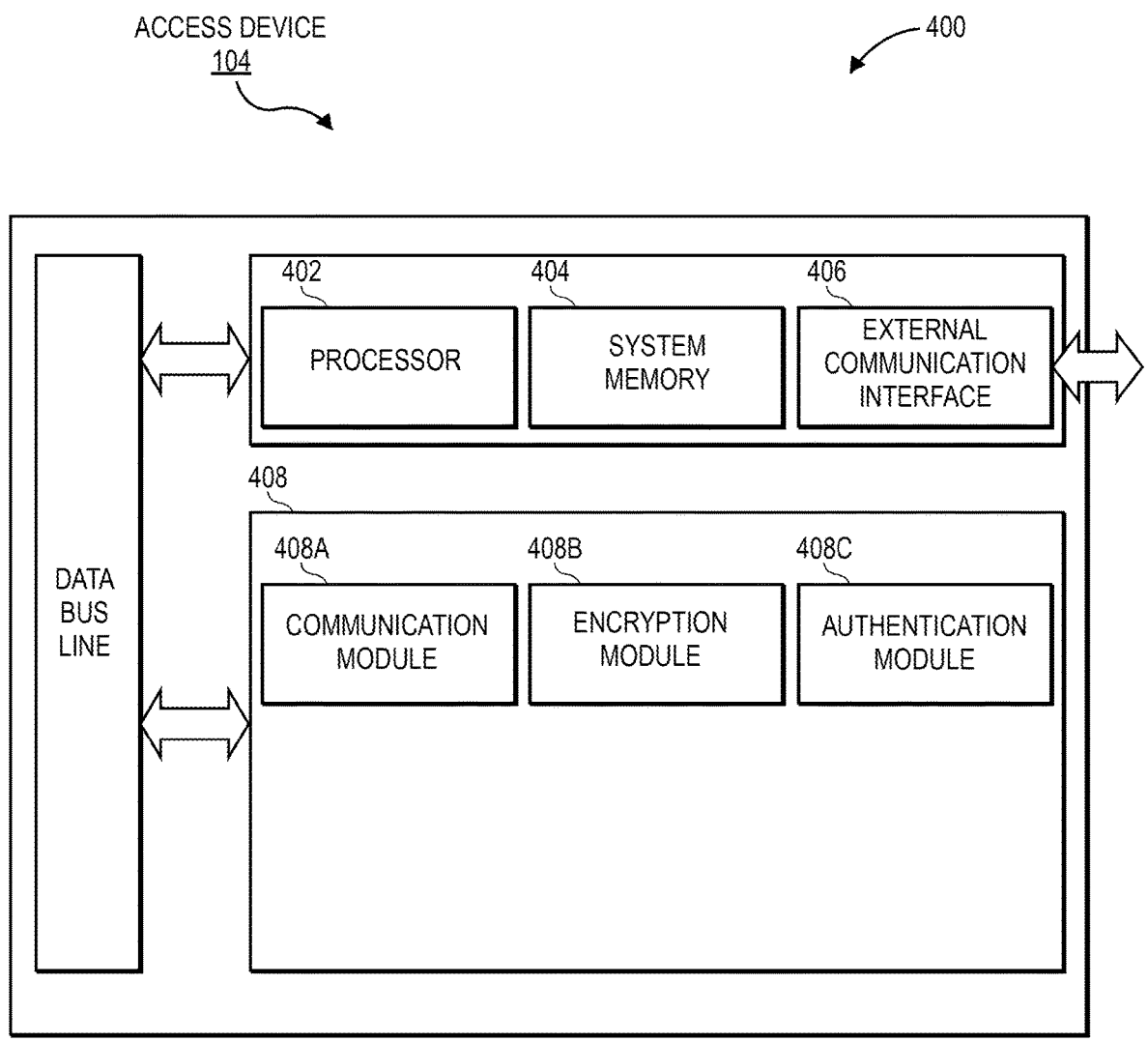
FIG. 4 shows a block diagram of an access device of the system according to embodiments of the invention.

FIG. 4 shows a block diagram 400 of an access device 104 of a resource provider system according to an embodiment of the invention. The access device 104 may comprise a processor 402, which may be coupled to a system memory 404 and an external communication interface 406. A computer readable medium 408 may also be operatively coupled to the processor 402.

The computer readable medium 408 may comprise a number of modules including a communication module 408A, an encryption module 408B, and an authentication module 408C.

The communication module 408A may comprise code that causes the processor 402 to generate messages, forward messages, reformat messages, and/or otherwise communicate with other entities. For example, the communication module 408A may be responsible for communicating with the portable device 102, including transmitting data elements that may be used by the portable device 102 for generating the cryptogram. Additionally, the communication module 408A may be responsible for transmitting and/or receiving messages from the resource provider computer 106 (e.g., transmitting an authentication request message, receiving an authorization response message).

The encryption module 408B may comprise code that includes any suitable encryption algorithms to encrypt data in embodiments of the invention. Suitable data encryption algorithms may include DES, tripe DES, AES, etc. It may also store encryption keys that can be used with such encryption algorithms. The encryption module 408B may utilize symmetric or asymmetric encryption techniques to encrypt and/or verify data. In some embodiments, one or more components of the encryption module 408B may be stored and/or performed within a secure element of the access device. In some embodiments, the encryption module 408B may be invoked to encrypt/decrypt messages. For example, the encryption module 408B may encrypt an elements of an authentication request message that is transmitted to the resource provider computer 106, including, for example, a portable device identifier, an intermediate access identifier, etc. In some embodiments, the encryption module 408B may also be used to perform one or more of the encryption functions used in generating a cryptogram (e.g., encryption/decryption functions 306, 314), for example, when generating a cryptogram to compare against the cryptogram received from portable device 102. In some embodiments, the encryption module 408B may also be used to decrypt messages (e.g., an authentication response message, an authorization response message). In some embodiments, the encryption module 408B may be used to communicate with a certificate authority to receive one or more digital certificates. The digital certificates may certify the ownership of a public key (e.g., a public verification key) by the named subject of the certificate (e.g., a payment processing network, resource provider, or other suitable entity).

The authentication module 408C may comprise code that performs verification of a cryptogram according to embodiments of the invention. In some embodiments, for example in a case where the processing computer 108 is tasked with generating a cryptogram and performing verification on behalf of the resource provider system, the authentication module 408C may transmit an authentication request message to another computer (e.g., to the resource provider computer 106) upon receiving the cryptogram from the portable device 102. The authentication request message may contain the cryptogram and one or more other data elements. In a non-limiting example, the data elements may contain the portable device identifier, the intermediate access identifier, and an ATC received from the portable device. The data elements may also contain other transaction related information (e.g., a transaction amount, etc.). In some embodiments, an authentication request message may utilize similar or identical data fields as a subsequent authorization request message for transaction processing (described further below), even though the values of each data field may be different. For example, the authentication request message may include an intermediate access identifier (e.g., a virtual PAN), while a subsequent authorization request message may include an access identifier (e.g., a PAN associated with a payment account). Also, the transaction amount in the authentication request message may be a zero value, while the transaction amount in a subsequent authorization request message may be a non-zero amount. In this way, as described above, embodiments of the present disclosure may utilize existing infrastructure to perform the authorization process. For example, whereas conventional techniques may utilize the data format of an authorization request message to authorize a transaction (e.g., perform the transaction processing phase), embodiments of the present disclosure may also utilize the data format of an authorization request message to validate a portable device (e.g., during the authentication phase). This utilization of the same message format for two different phases also provides a technical advantage of facilitating a more efficient authorization process. For example, a processing computer 108 of a payment processing network that may typically process payment transactions may also be utilized to authenticate a portable device. In some cases, this may reduce the number of messages being transmitted, which may result in significant aggregate saving of processing resources and/or network bandwidth utilization over a large number of transactions.

In some embodiments, for example, where the access device 104 is equipped to generate a cryptogram (e.g., containing a hardware security module with cryptographic keys), the authentication module 408C may execute operations that are substantially similar to those described in reference to FIG. 3. For example, the authentication module 408C may receive the cryptogram from the portable device 102 along with one or more data elements (e.g., the portable device identifier, the intermediate access identifier, an ATC, etc.). In some embodiments, instead of sending the cryptogram and other data elements to another device for verification, the authentication module 408C may then generate a cryptogram using the data elements received. In embodiments where the access device 104 generates the cryptogram, the access device 104 may store a master derivation key that is used to generate a unique derivation key via key derivation parameters, as described above. The master derivation key may be determined by a suitable entity such as the payment processing network and stored in the hardware security module. Once the cryptogram is generated (e.g., a "second cryptogram"), the second cryptogram may be compared with the cryptogram generated by the portable device 102 to determine if they match (e.g., performing a bitwise comparison). Upon completion of the verification, the authentication module 408C may return an authentication response message (e.g., including an authorization response indicator) to the resource provider computer 106.

In some embodiments, the authentication module 408C may verify a cryptogram without contact the processing computer 108 and without requiring generation of a cryptogram. For example, the authentication module 408C may receive a cryptogram from the portable device 102, which may correspond to a digital signature. The authentication module 408C may also receive one or more data elements (e.g., the portable device identifier). The authentication module 408C may then utilize a public key infrastructure to verify the digital signature. For example, the authentication module 408C may utilize the encryption module 408B to determine a hash of the portable device identifier by using a public verification key. The public verification key may have been previously received by a suitable entity (e.g., a trusted certificate authority). The authentication module 408C may then verify the cryptogram by determining if the determined (e.g., computed) hash matches the digital signature, for example, by performing a bitwise comparison.

Figure 5:
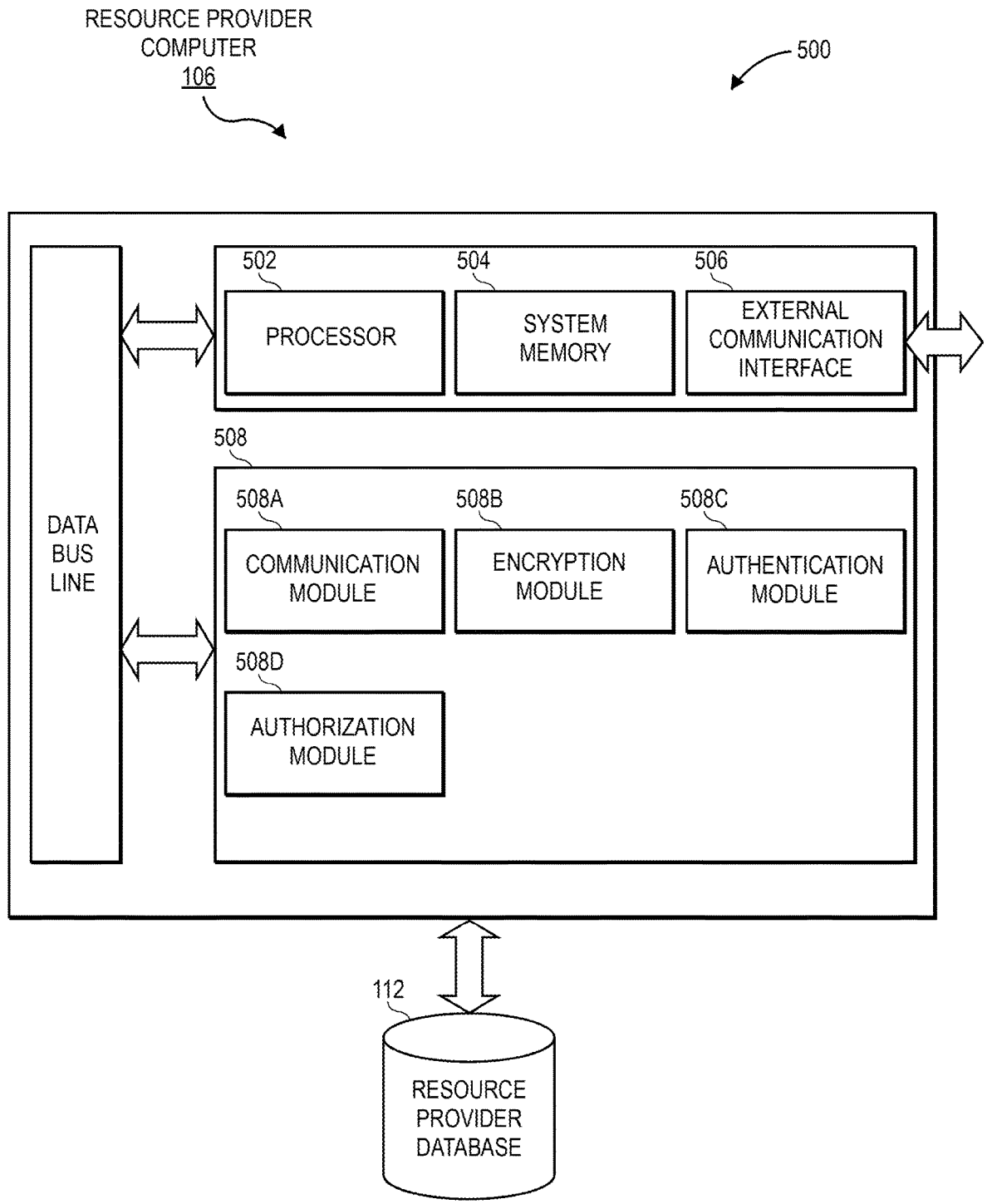
FIG. 5 shows a block diagram of a resource provider computer of the system according to embodiments of the invention.

FIG. 5 shows a block diagram 500 of a resource provider computer 106 of a resource provider system according to an embodiment of the invention. The resource provider computer 106 may comprise a processor 502, which may be coupled to a system memory 504 and an external communication interface 506. A computer readable medium 508 may also be operatively coupled to the processor 502.

The resource provider computer 106 may be coupled to a resource provider database 112, whereby the resource provider computer 106 stores a mapping between identifiers. For example, the database may store a mapping between one or more of a portable device identifier (e.g., a membership ID), an access identifier, and an intermediate access identifier. In some embodiments, these mappings may be determined within a "setup phase" that precedes the authentication phase, as follows. For example, a resource provider may assign a membership ID to a user. The resource provider may subsequently provision a portable device to the user, and then assign the membership ID to be the value of a portable device identifier of the portable device. In some embodiments, the portable device identifier may be stored in a secure element on the portable device. The resource provider may further obtain an intermediate access identifier (e.g., a virtual PAN), as described above, and assign the intermediate access identifier to the portable device (e.g., stored in the secure element). Once the user receives the portable device 102, the user may associate their payment credentials (e.g., an access identifier such as a PAN) with their membership account, such that the payment credentials are "on-file" with the resource provider, and thus stored in the database 112. This may be done, for example, in person, over the phone, or on a website of the resource provider. In this way, the setup phase may assist in enabling a one-step authorization process.

The computer readable medium 508 may comprise a number of modules including a communication module 508A, an encryption module 508B, an authentication module 508C, and an authorization module 508D.

The communication module 508A may comprise code that causes the processor 502 to generate messages, forward messages, reformat messages, and/or otherwise communicate with other entities. For example, the communication module 508A may be responsible for communicating with the access device 104, including receiving an authentication request message and/or authentication response message, transmitting an authorization response message, etc. The communication module 508A may also transmit/receive messages from the processing computer 108, as described further below.

The encryption module 508B may comprise code that includes any suitable encryption algorithms to encrypt data in embodiments of the invention. Suitable data encryption algorithms may include DES, tripe DES, AES, etc. It may also store encryption keys that can be used with such encryption algorithms. The encryption module 508B may utilize symmetric or asymmetric encryption techniques to encrypt and/or verify data. In some embodiments, the encryption module 508B may be invoked to encrypt/decrypt messages. For example, the encryption module 508B may encrypt an elements of an authentication request message that is transmitted to the processing computer 108, including, for example, a portable device identifier, an intermediate access identifier, etc. In some embodiments, the encryption module 508B may also be used to decrypt messages (e.g., an authentication response message, an authorization response message).

The authentication module 508C may comprise code that performs verification of a cryptogram according to embodiments of the invention. In some embodiments, this module serve as a conduit that receives a cryptogram along with one or more data elements, and then transmits them to the processing computer 108 for verification. In some embodiments, the authentication module 508C may additionally send other elements to the processing computer 108 for verification (e.g., an access identifier associated with the portable device identifier). In some embodiments, upon receiving an authentication response message from the processing computer 108 (e.g., an authentication code or indicator verifying that the cryptogram verification was successful), the authentication module 508C may use the portable device identifier (e.g., membership ID) to retrieve the user's membership account information from the resource provider database 112. The authentication module 508C may then verify that the user's account conforms to one or more rules of the resource provider system (e.g., verifying that membership privileges have not lapsed). In some embodiments, the resource provider computer 106 may perform a verification of the user's account with the resource provider prior to sending the cryptogram to the processing computer 108 for verification. For example, the resource provider computer 106 may receive a cryptogram along with a portable device identifier from access device 104, and, before re-transmitting the cryptogram for verification, may use the portable device identifier to look up the user's account information. Upon verifying that the account with the resource provider is in good standing, the resource provider computer 106 may re-transmit the cryptogram for authentication of the portable device by the processing computer 108.

The authorization module 508D may comprise code that performs a portion of the transaction processing phase of the authorization process. In some embodiments, upon receiving an authentication response indicator confirming successful verification of the cryptogram (e.g., from the access device 104 or the processing computer 108), the authorization module 508D may initiate a card-on-file transaction. For example, the authorization module 508D may utilize the portable device identifier (or other session identifier) to retrieve the user's payment credentials (e.g., an access identifier such as a PAN, expiration date, and other relevant transaction information). The authorization module 508D may then generate an authorization request message that includes the access identifier, and then transmit the authorization request message to the processing computer 108. In some embodiments, the authorization request message may include similar elements to as described in reference to static data elements 304 of FIG. 3 (e.g., a transaction amount, a terminal country code, Terminal Verification Results (TVR), a transaction currency code, a transaction data, a transaction type, an unpredictable (e.g., random) number, etc.). In some embodiments, the authorization request message may include an authentication indicator (e.g., a code that serves as proof of authentication) that may be used by the processing computer 108 and/or 116 authorization computer 116 to perform authorization of the transaction. Upon successful authorization, the authorization module 508D may receive an authorization response message including an authorization response indicator. In some embodiments, the authorization module 508D may also transmit the authorization response indicator to the access device 104 (e.g., an AFD), which in turn may provide a resource (e.g., unlocking a fuel dispenser) to the user.

In some embodiments, one or more authorization request messages may be transmitted and/or received as part of the transaction processing phase. For example, in a case where a user is requesting to purchase fuel for their vehicle. The user may not know in advance how much fuel they will need to purchase. Accordingly, after authentication of the portable device, a pre-authorization request message (e.g., a type of authorization request message) may be transmitted to the processing computer 108 for pre-authorization. The pre-authorization request message may also include the access identifier corresponding to the user's account with the payment card issuer. However, a value data field corresponding to the transaction amount may be set to zero. Subsequently, after receiving a pre-authorization response message from the processing computer 108 and determining the final transaction amount, a second authorization request message containing the actual transaction amount (i.e. a non-zero numeral) may be transmitted for authorization.

It should be understood that the operations of the authorization module 508D may not require any further input from the portable device subsequent to receiving the initial cryptogram from the portable device. In this way, embodiments of the present disclosure may reduce the number of steps taken by the user to execute a transaction. As noted above, this may increase efficiency in processing transactions and also improve security by utilizing cryptograms to authenticate the portable device (e.g., instead of a user entering credentials in a potentially open space).

Figure 6:
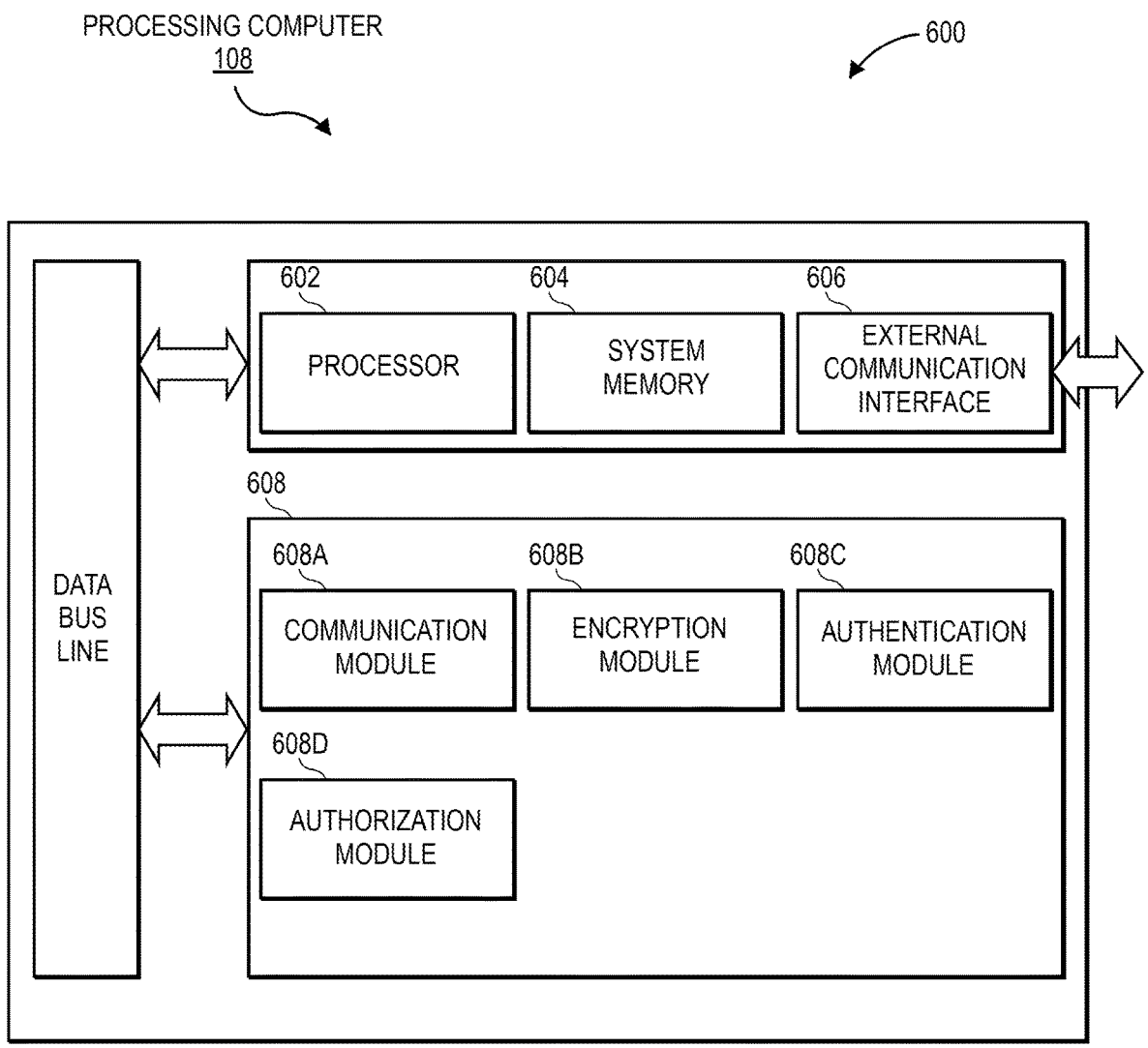
FIG. 6 shows a block diagram of a processing computer of the system according to embodiments of the invention.

FIG. 6 shows a block diagram of a processing computer 108 of a system according to embodiments of the invention. The processing computer 108 may comprise a processor 602, which may be coupled to a system memory 604 and an external communication interface 606. A computer readable medium 608 may also be operatively coupled to the processor 602.

The computer readable medium 608 may comprise a number of modules including a communication module 608A, an encryption module 608B, an authentication module 608C, and an authorization module 608D.

The communication module 608A may comprise code that causes the processor 602 to generate messages, forward messages, reformat messages, and/or otherwise communicate with other entities. For example, the communication module 608A may be responsible for communicating with the resource provider computer 106, including receiving an authentication request message and/or authorization request message. In other examples, the communication module 608A may be responsible for communication between the processing computer 108 and an authorization computer 116.

The encryption module 608B may comprise code that includes any suitable encryption algorithms to encrypt data in embodiments of the invention. Suitable data encryption algorithms may include DES, tripe DES, AES, etc. It may also store encryption keys that can be used with such encryption algorithms. The encryption module 608B may utilize symmetric or asymmetric encryption techniques to encrypt and/or verify data. In some embodiments, one or more components of the encryption module 608B may be stored and/or performed within a secure element of the processing computer 108. For example, the secure element may be implemented at least in part by a hardware security module 110 that is connected to the processing computer 108. In some embodiments, the encryption module 608B may be invoked to encrypt/decrypt messages. For example, the encryption module 608B may decrypt elements of an authentication request message that is transmitted to the processing computer 108, including, for example, a portable device identifier, an intermediate access identifier, etc. In some embodiments, the encryption module 608B may also be used to perform one or more of the encryption functions used in generating a cryptogram (e.g., encryption/decryption functions 306, 314), for example, when generating a second cryptogram to compare against the cryptogram generated by portable device 102. In some embodiments, the encryption module 608B may also be used to encrypt/decrypt messages (or elements of messages) sent and/or received from the authorization computer 116 (e.g., an authorization request message).

The authentication module 608C may comprise code that performs verification of a cryptogram according to embodiments of the invention. In some embodiments, where the processing computer 108 is tasked with generating a cryptogram and performing verification on behalf of the resource provider system, the authentication module 608C may receive an authentication request message from the resource provider computer 106. The authentication module 608C may then execute operations that are substantially similar to those described in reference to FIG. 3. For example, the authentication module 408C may receive the cryptogram from the portable device 102 along with one or more data elements (e.g., the portable device identifier, the intermediate access identifier, an ATC, etc.). In some embodiments, the processing computer 108 may have received one or more of the data elements prior to authorization process. For example, the resource provider computer 106 may transmit a mapping between a portable device identifier and an intermediate access identifier, and the processing computer 108 may store the mapping in advance of the authorization process. In this example, the authorization request message may contain the portable device identifier without an intermediate access identifier, which the processing computer 108 may then use to retrieve (e.g., from a database of the processing computer) the intermediate access identifier for input to generate a cryptogram. In some embodiments, once the required data elements are received by the processing computer 108, the authentication module 608C may then generate a cryptogram. In embodiments, the processing computer 108 may store a master derivation key that is used to generate a unique derivation key via key derivation parameters, as described above. The master derivation key may be determined by a suitable entity such as the payment processing network and stored in the secure element (e.g., hardware security module 110). Once the cryptogram is generated (e.g., the "second cryptogram"), the second cryptogram may be compared with the cryptogram generated by the portable device 102 to determine if they match (e.g., performing a bitwise comparison). Upon completion of the verification, the authentication module 408C may return an authentication response message (e.g., including an authorization response indicator) to the resource provider computer 106.

The authorization module 608D may comprise code that performs a portion of the transaction processing phase of the authorization process. In some embodiments, the authorization module 608D may receive an authorization request message from the resource provider system (e.g., resource provider computer 106). In some embodiments, the authorization request message may contain at least an access identifier that is associated with an account (e.g., a debit account) maintained by an issuer entity (e.g., associated with the authorization computer 116) on behalf of the user. In some embodiments, the authorization request message may contain other elements. For example, as described in reference to authorization module 508D of the resource provider computer 106, the authorization request message may also include an authorization code or indicator that serves as a proof of a previous authentication of the portable device performed during the authentication phase. Upon receiving the authorization request message, the authorization module 608D may transmit a second authorization request message to the authorization computer 116. In some embodiments, the second authorization request message may include additional (and/or modified elements) from the authorization request message received from the resource provider computer 106. For example, the processing computer 108 may perform one or more validations using the access identifier (e.g., determining a risk of fraud based on previous transactions using that access identifier). After transmitting the second authorization message to the authorization computer 116, the processing computer 108 may receive an authorization response message from the authorization computer 116 containing an authorization response indicator, which may serve as a proof of authorization. The processing computer 108 may then transmit a second authorization response message including the authorization response indicator to the resource provider system. As described above, in some embodiments, the processing computer 108 may also perform "stand-in" processing for the resource provider 106 to authorize a transaction (e.g., a payment transaction). For example, an issuer (e.g., authorization computer 116) may delegate tasks including authorization of a transaction to the processing computer 108, so that the processing computer 108 is able to authorize the transaction on behalf of the issuer. For example, the processing computer 108 may issue and/or manage payment tokens that respectively map to access identifiers issued by the issuer, and thus perform stand-in processing of a payment token to authorize a transaction. Thus, it should be understood that processing computer 108 may be equipped to perform stand-in processing for either or both phases of the authorization process.

Continuing now with FIGS. 1A and 1B, and as discussed above, each figure respectively depicts a method for performing embodiments of the invention. FIG. 1A shows a method depicting an authentication phase of the authorization process, while FIG. 2A shows a method depicting a transaction processing phase of the authorization process that follows a completion of the authentication phase. Prior to both phases, a resource provider (e.g., associated with resource provider computer 106) may have provisioned a portable device 102 and/or portable device identifier to a user. For example, in some embodiments where the portable device 102 itself is provisioned by the resource provider to the user (e.g., a key fob, membership card, etc.), the portable device may have a portable device identifier stored on the portable device 102 (e.g., on a secure element). In other embodiments, for example, where the portable device 102 is a mobile phone of the user, the resource provider may provision a portable device identifier to be stored on the mobile device. In some embodiments, any suitable information may also be provisioned on the portable device 102 (e.g., including an intermediate access identifier). Additionally, as described earlier, once the user receives the portable device 102, the user may associate their payment credentials (e.g., an access identifier such as a PAN) with their membership organization account, such that the payment credentials are "on-file" with the resource provider (e.g., stored in resource provider database 112).

In the illustrated flow of FIG. 1A, in step S101, an authorization process may be initiated by a resource provider system receiving a portable device identifier and a cryptogram from a portable device 102. In some embodiments, a user may initiate a transaction with the resource provider system by tapping the portable device 102 to a contactless interface on the access device 104 (e.g., an AFD). In initiating the transaction, the portable device can send a message including the portable device identifier and a cryptogram (e.g., an authorization request cryptogram (ARQC)) to the access device 104. The cryptogram may be generated by encrypting various data with one or more cryptographic keys stored on the portable device 102, and/or derived from data on the portable device, for example, as described in reference to FIG. 3. Such data might include the portable device identifier, an intermediate access identifier, transaction information, portable device information, etc. As described above, in some embodiments, the cryptogram generation module 102A of portable device 102 may perform the cryptogram generation, which may be similar to cryptogram generation module 240A of FIG. 2.

In step S102, the resource provider system may verify the cryptogram. In some embodiments, the verification of the cryptogram may proceed by the access device 104 of the resource provider system generating an authentication request message including the portable device identifier and the cryptogram. In this example, the access device 104 may transmit the authentication request message to the resource provider computer 106 (e.g., and/or request that the resource provider computer 106 generate an authentication request message), and the resource provider computer 106 may in turn transmit the authentication request message to the processing computer 108 for verification. In some embodiments, this may be done following an established contactless payment protocol, such as EMV. In some embodiments, the authorization request message may also contain a value data field (e.g., transaction amount) comprising zero or being empty, since the authentication phase may precede the transaction processing phase. In some embodiments, one or more intermediary entities may be involved in processing the authentication request message (e.g., an acquirer computer 114).

In steps S103-S105, the payment processing network (e.g., processing computer 108) may receive the authentication request message including the cryptogram and the portable device identifier from the resource provider computer 106, and then determine that the cryptogram is authenticated. In step S103, in some embodiments, the processing computer 108 may send a message to a secure element (e.g., an hardware security module 110) for authentication. In some embodiments, a processing computer 108 may perform steps S103-S105 without utilizing a secure element.

In step S104, the hardware security module 110 of processing computer 108 may verify the cryptogram. In some embodiments, verifying the cryptogram by the hardware security module 110 may involve the hardware security module 110 generating a second cryptogram based at least in part on the portable device identifier. In some embodiments, the second cryptogram may be generated based also in part on an intermediate access identifier, or any suitable data (e.g., transaction information, portable device information, etc.) that may be associated with the portable device identifier. In some embodiments, hardware security module 110 may generate the cryptogram using a method similar to that depicted in reference to FIG. 3 and as described in reference to authentication module 608C of FIG. 6. Upon generating the second cryptogram, the hardware security module 110 may compare the second cryptogram with the cryptogram to determine if they match (e.g., performing a bitwise comparison). If the cryptograms are determined to match, then the portable device is authenticated.

In step S105, the hardware security module 110 may send an authentication response message including an authentication response indicator, such as an authorization response cryptogram (ARPC) or an ARQC authentication result code, to the processing computer 108, indicating that the cryptogram has been verified. The payment processing network can then generate and send an authorization response message including the portable device identifier and the authentication response indicator to the resource provider computer 106, indicating if the portable device 102 has been authenticated.

It should be understood that, in some embodiments, the step S102 of verifying the cryptogram may be performed without transmitting an authentication request message to the payment processing network (e.g., processing computer 108). In this case, the steps S103-S105 may be unnecessary. For example, in some embodiments, the resource provider system (e.g., access device 104) may generate a second cryptogram based at least in part on the portable device identifier. In some embodiments, the resource provider system may generate the second cryptogram using a method similar to that depicted in reference to FIG. 3 and as described in reference to authentication module 408C of FIG. 4. Upon generating the second cryptogram, the resource provider system may compare the second cryptogram with the cryptogram to determine if they match (e.g., performing a bitwise comparison). If the cryptograms are determined to match, then the portable device is authenticated.

In other embodiments, the resource provider system (e.g., access device 104) may verify a cryptogram without contacting the processing computer 108 and without generating a second cryptogram. For example, as described above, the access device 104 may receive the cryptogram (e.g., a digital signature) from the portable device 102 along with a portable device identifier. The access device 104 may utilize a public key infrastructure to receive a public verification key. In some embodiments, the public verification key may be received before the authorization process begins. The access device 104 may determine (e.g., compute) a hash of the portable device identifier using the public verification key. Then the access device 104 may verify the cryptogram by determining if the hash matches the digital signature.

In embodiments where the access device 104 verifies the cryptogram without contacting the processing computer 108 (e.g., without performing steps S103-S105), the access device 104 may then generate and send an authorization response message including the portable device identifier and the authentication response indicator to the resource provider computer 106, indicating if the portable device 102 has been authenticated. In any case, whether the access device 104 verifies the cryptogram and/or the processing computer 108 verifies the cryptogram, upon verification of the cryptogram, the resource provider system may obtain an authentication response indicator after verification of the cryptogram.

In step S106, the resource provider system (e.g., resource provider computer 106) may utilize a membership ID for the user associated with the portable device 102 to retrieve the user's membership account information from a resource provider database 112, as described in reference to FIG. 5. The resource provider can use the membership ID, for example, to verify that the user's account with the resource provider is in good standing. As described above, in some embodiments, step S106 may be performed prior to verification of the cryptogram (e.g., steps S102-S105).

Turning now to the transaction processing phase of the authorization process, FIG. 1B depicts a flow diagram of a subsequent card-on-file transaction after receiving a positive authentication response indicator. It should be understood that the transaction processing phase may immediately follow the authentication phase so that the authorization process may be performed in real-time.

In step S107, the resource provider computer 106 may search the resource provider database 112 and retrieve an access identifier (e.g., a PAN). In other embodiments, if the portable device does not have an intermediate access identifier, then the resource provider computer 106 may retrieve an intermediate access identifier. This retrieval may be done using the portable device identifier, or other suitable look-up key. In some embodiments, the access identifier and/or the intermediate access identifier may have a different data format than the portable device identifier. In some embodiments, the access identifier may have the same or different data format as the intermediate access identifier described above, in reference to FIG. 1A. In some embodiments, where the access identifier and the intermediate access identifier are the same data format, but may have different values.

In step S108, continuing with an embodiment in which the access identifier is being used to conduct the transaction processing phase, the resource provider system may generate a first authorization request message that includes the access identifier (or the intermediate access identifier), based at least in part on the authentication response indicator indicating that the portable device 102 has been authenticated. The resource provider system may then transmit the first authorization request message to the processing computer 108. In some embodiments, this step may be performed by the authorization module 508D of the resource provider computer 106. In some embodiments, as described in step S109 below, the first authorization request message may first be sent to an intermediary entity (e.g., a transport computer 114, which may be an acquirer of the resource provider). In some embodiments, the first authorization request message may be in the form of a pre-authorization request including the user's transaction information (e.g., a transaction amount) and other suitable information. In the case of a pre-authorization request, the pre-authorization request may request pre-authorization for a certain amount. For example, a pre-authorization request message may request authorization for $100 for a fuel transaction, because it is not known at the time of interaction how much fuel a consumer will purchase. Once authorized, a hold of $100 may be placed on the account. After the final amount of fuel to be purchased is determined, the resource provider computer 106 may subsequently send a subsequent authorization request message with the actual amount, and the $100 hold may be released. Transaction identifiers may be associated with a pre-authorization request message and its corresponding subsequent authorization request message. It should be understood that, in the case where the authorization request message is a pre-authorization request, the steps S108-S113 may be performed twice, both based on the previously completed authentication phase described above.

In step S109, the transport computer 114 may transmit the first authorization request message to the processing computer 108 which may be in a payment processing network. If the authorization request message includes the intermediate access identifier and not the access identifier, then the processing computer 108 may exchange the access identifier (e.g., a real PAN) for the intermediate access identifier (e.g., a token). The processing computer 108 may then transmit a second authorization request message including the access identifier to the authorization computer 116 that is associated with the issuer of the account associated with the access identifier. In some embodiments, this step may be performed by the authorization module 608D of the processing computer 108. In some embodiments, the processing computer 108 may not transmit a second authorization request message to the authorization computer 116. For example, the processing computer 108 may be tasked with performing stand-in processing on behalf of the authorization computer 116. In this case, the processing computer 108 may additionally perform functions similar to authorization computer 116, as described in reference to FIG. 6, and thus, one or more of steps S110-S111 may be performed by processing computer 108.

In step S110, the authorization computer 116 may authorize the transaction. In some embodiments, the authorization computer 116 may authorize the transaction based at least in part on the access identifier. Upon authorization, an authorization response indicator (e.g., an authorization code) may be generated, which may be a proof of authorization. In some embodiments, if the transaction is authorized, the authorization computer 116 may place a pre-authorization hold on the account of the consumer until a subsequent authorization request message is received (e.g., containing a non-zero transaction amount).

In step S111, the processing computer 108 may receive from the authorization computer 116 a first authorization response message containing the authorization response indicator and the access identifier.

In step S112, the processing computer 108 may transmit to the resource provider system (e.g., resource provider computer 106) a second authorization response message including the authorization response indicator. In some embodiments, the processing computer 108 may first transmit the second authorization response message to an intermediary (e.g., transport computer 114), upon which the intermediary may transmit the second authorization response message to the resource provider system. In some embodiments, if an intermediate access identifier is used in the authorization process, then the processing computer 108 may exchange the access identifier in the authorization request message with the intermediate access identifier.

In step S113, the resource provider computer 106 may transmit the second authorization response message (comprising the access identifier or the intermediate access identifier) to the access device 104 to present the status of the transaction to the consumer and/or provide a resource to the user (e.g., unlocking a fuel dispenser). In some embodiments, step S113 may be optional, for example, when the access device 104 and the resource provider computer 106 are included within a single physical unit that corresponds to the resource provider system. In some embodiments, upon the resource provider system receiving from the processing computer the authorization response message (e.g., the second authorization response message) including the authorization response indicator, the authorization process may be completed. In some embodiments, following completion of the authorization process, other suitable transaction post-authorization steps may be performed (e.g., clearing processes between one or more financial institutions to settle the transaction).

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   initiating an authorization process by receiving, by a resource provider system from a portable device, a portable device identifier and a cryptogram generated by the portable device using the portable device identifier and a unique derivation key generated based on a key derivation parameter comprising an intermediate access identifier associated with the portable device identifier, the intermediate access identifier comprising a virtual primary account number not operable for being used to directly conduct a transaction;
   obtaining, by the resource provider system, the intermediate access identifier using the received portable device identifier;
   determining, by the resource provider system, the key derivation parameter using at least the obtained intermediate access identifier;
   generating, by the resource provider system, the unique derivation key using at least the determined key derivation parameter;
   generating, by the resource provider system, a second cryptogram using the received portable device identifier and the generated unique derivation key;
   verifying, by the resource provider system, the cryptogram by determining that the second cryptogram matches the cryptogram generated by the portable device;
   obtaining, by the resource provider system, an authentication response indicator after verification of the cryptogram;
   generating, by the resource provider system based at least in part on the authentication response indicator, an authorization request message comprising an access identifier, the access identifier being a payment credential having the same format as the intermediate access identifier;
   transmitting, by the resource provider system, the authorization request message to a processing computer; and
   receiving, by the resource provider system from the processing computer, an authorization response message comprising an authorization response indicator, wherein the authorization process is performed in real-time and is completed by receipt of the authorization response message.

2. The method of claim 1, wherein the portable device identifier and the access identifier have different data formats.

3. The method of claim 1, wherein the intermediate access identifier has a data format that is different from a data format of the portable device identifier.

4. The method of claim 1, wherein the portable device is a key fob or a mobile phone, and the resource provider system comprises an access device, the access device being an automated fuel dispenser.

5. The method of claim 1, further comprising:
   prior to the initiating the authorization process, determining, by the resource provider system, the intermediate access identifier for the portable device; and
   associating, by the resource provider system, the intermediate access identifier with the portable device.

6. The method of claim 5, wherein the intermediate access identifier is stored on the portable device.

7. A resource provider system comprising:
   a processor; and
   a non-transitory computer readable medium coupled to the processor, the non-transitory computer readable medium comprising code, executable by the processor, for implementing a method including:
      initiating an authorization process by receiving, from a portable device, a portable device identifier and a cryptogram generated by the portable device using the portable device identifier and a unique derivation key generated based on a key derivation parameter comprising an intermediate access identifier associated with the portable device identifier, the intermediate access identifier comprising a virtual primary account number not operable for being used to directly conduct a transaction;
      obtaining the intermediate access identifier using the received portable device identifier;
      determining the key derivation parameter using at least the obtained intermediate access identifier;
      generating the unique derivation key using at least the determined key derivation parameter;
      generating a second cryptogram using the received portable device identifier and the generated unique derivation key;
      verifying the cryptogram by determining that the second cryptogram matches the cryptogram generated by the portable device;
      obtaining an authentication response indicator after verification of the cryptogram;
      generating, based at least in part on the authentication response indicator, an authorization request message comprising an access identifier, the access identifier being a payment credential having the same format as the intermediate access identifier;
      transmitting the authorization request message to a processing computer; and
      receiving, from the processing computer, an authorization response message comprising an authorization response indicator, wherein the authorization process is performed in real-time and is completed by receipt of the authorization response message.

8. The resource provider system of claim 7, wherein the generating the unique derivation key further includes:
   determining a first cryptographic key; and
   generating, based on the key derivation parameter and the first cryptographic key, the unique derivation key.

9. The resource provider system of claim 7, further comprising an access device,
   wherein at least one of the access device or the processing computer comprises a hardware security module (HSM), the hardware security module utilizable for generating the second cryptogram.

10. The resource provider system of claim 7, wherein the method further includes:

validating that a user account corresponding to a user of the portable device conforms to one or more rules of the resource provider system.

11. The resource provider system of claim 7, wherein the access identifier is associated with a user account maintained by an authorization computer, the access identifier operable for being used to directly conduct a transaction.

12. The resource provider system of claim 7, wherein the authorization request message further comprises a value data field that is set to zero or empty, and wherein the method further includes:
transmitting a subsequent authorization request message to the processing computer, the subsequent authorization request message comprising the value data field that is set to a non-zero numeral.

13. A method comprising:
receiving, by a processing computer from a resource provider system in an authorization process, an authentication request message comprising a portable device identifier and a cryptogram generated by a portable device using the portable device identifier and a unique derivation key generated based on a key derivation parameter comprising an intermediate access identifier associated with the portable device identifier, the intermediate access identifier comprising a virtual primary account number not operable for being used to directly conduct a transaction;
obtaining, by the processing computer, the intermediate access identifier using the received portable device identifier;
determining, by the processing computer, the key derivation parameter using at least the obtained intermediate access identifier;
generating, by the processing computer, the unique derivation key using at least the determined key derivation parameter;
generating, by the processing computer, a second cryptogram using the received portable device identifier and the generated unique derivation key;
determining, by the processing computer, that the cryptogram is validated by determining that the second cryptogram matches the cryptogram generated by the portable device;
transmitting, by the processing computer, an authentication response message to the resource provider system;
receiving, by the processing computer from the resource provider system, a first authorization request message comprising an access identifier, the access identifier being a payment credential having the same format as the intermediate access identifier;
transmitting, by the processing computer, a second authorization request message comprising the access identifier to an authorization computer;
receiving, by the processing computer from the authorization computer, a first authorization response message containing an authorization response indicator; and
transmitting, by the processing computer to the resource provider system, a second authorization response message comprising the authorization response indicator, wherein the authorization process is performed in real-time.

14. The method of claim 13, wherein the portable device identifier and the access identifier have different data formats.

* * * * *